US011844142B2

(12) United States Patent
Ying et al.

(10) Patent No.: US 11,844,142 B2
(45) Date of Patent: Dec. 12, 2023

(54) COMMUNICATIONS METHOD AND APPARATUS

(71) Applicant: HUAWEI TECHNOLOGIES CO., LTD., Guangdong (CN)

(72) Inventors: Jiangwei Ying, Beijing (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 318 days.

(21) Appl. No.: 17/217,434

(22) Filed: Mar. 30, 2021

(65) Prior Publication Data

US 2021/0219124 A1 Jul. 15, 2021

Related U.S. Application Data

(63) Continuation of application No. PCT/CN2019/104968, filed on Sep. 9, 2019.

(30) Foreign Application Priority Data

Sep. 30, 2018 (CN) .......................... 201811161320.X

(51) Int. Cl.
*H04W 8/08* (2009.01)
*H04W 76/12* (2018.01)
(Continued)

(52) U.S. Cl.
CPC ............. *H04W 8/08* (2013.01); *H04W 48/16* (2013.01); *H04W 48/18* (2013.01); *H04W 76/12* (2018.02)

(58) Field of Classification Search
CPC ....... H04W 8/08; H04W 48/16; H04W 48/18; H04W 76/12; H04W 92/24;
(Continued)

(56) References Cited

U.S. PATENT DOCUMENTS

| 11,622,320 B2 * | 4/2023 | Huang | ................. | H04W 48/18 370/329 |
| 11,622,398 B2 * | 4/2023 | Vikberg | ................ | H04W 48/20 370/329 |

(Continued)

FOREIGN PATENT DOCUMENTS

| CN | 108323245 A | 7/2018 |
| CN | 108401269 A | 8/2018 |

(Continued)

OTHER PUBLICATIONS

3GPP TR 33.899 V1.3.0 (Sep. 2017), 3rd Generation Partnership Project; Technical Specification Group Services and System Aspects; Study on the security aspects of the next generation system(Release 14), 604 pages.

(Continued)

*Primary Examiner* — Julio R Perez

(74) *Attorney, Agent, or Firm* — Fish & Richardson P.C.

(57) ABSTRACT

The present disclosure relates to communications methods and apparatus. In one example method, a terminal device generates a first message. The first message is used to request to establish a protocol data unit (PDU) session home-routed to a first network. The terminal device sends the first message to a first access and mobility management function (AMF) entity. The first AMF entity is a network element in a second network.

20 Claims, 18 Drawing Sheets

(51) Int. Cl.
*H04W 48/16* (2009.01)
*H04W 48/18* (2009.01)

(58) Field of Classification Search
CPC ......... H04W 36/0027; H04W 36/0033; H04W 76/15; H04L 12/4633
See application file for complete search history.

(56) References Cited

U.S. PATENT DOCUMENTS

| | | | | |
|---|---|---|---|---|
| 2023/0100696 | A1* | 3/2023 | Potharaju | H04L 67/141 370/331 |
| 2023/0104381 | A1* | 4/2023 | Faccin | H04B 7/1855 370/316 |
| 2023/0108625 | A1* | 4/2023 | Yi | H04W 76/15 370/328 |
| 2023/0109664 | A1* | 4/2023 | Gundavelli | H04W 60/00 455/411 |

FOREIGN PATENT DOCUMENTS

| | | |
|---|---|---|
| CN | 108401271 A | 8/2018 |
| WO | 2018111029 A1 | 6/2018 |
| WO | 2018174509 A1 | 9/2018 |

OTHER PUBLICATIONS

3GPP TS 23.502 V15.3.0 (Sep. 2018), "3rd Generation Partnership Project; Technical Specification Group Services and System Aspects; Procedures for the 5G System; Stage 2 (Release 15)," Sep. 2018, 329 pages.
Ericsson, "OI 4c: Handover and slicing," SA WG2 Meeting #123, S2-176981, Ljubljana, Slovenia, Oct. 23-27, 2017, 23 pages.
Huawei, HiSilicon, "SMF selection in roaming case," SA WG2 Meeting #122, S2-174542, San Jose Del Cabo, Mexico, Jun. 26-30, 2017, 13 pages.
Office Action issued in Chinese Application No. 201811161320.X dated Jul. 29, 2020, 7 pages.
PCT International Search Report and Written Opinion issued in International Application No. PCT/CN2019/104968 dated Nov. 27, 2019, 16 pages (with English translation).
ETRI, "23.502—Alignment for 23.501 with 23.502 for PDU Session establishment," SA WG2 Meeting #124, 62-178899, Reno, Nevada, Nov. 27-Dec. 1, 2017, 12 pages.
Extended European Search Report issued in European Application No. 19864342.1 dated Oct. 14, 2021, 10 pages.

* cited by examiner

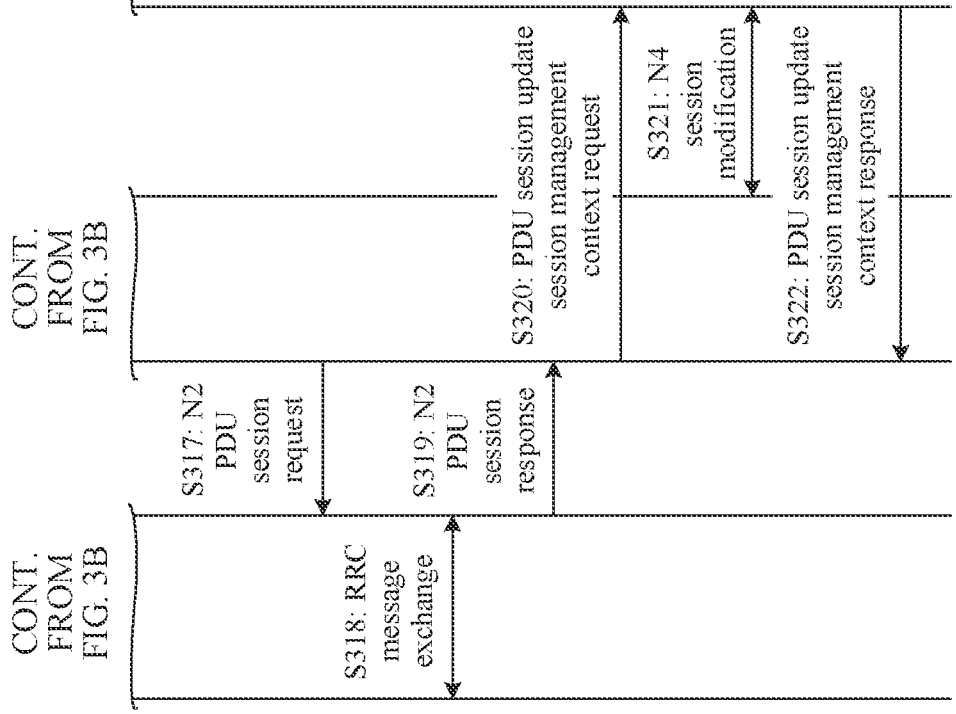

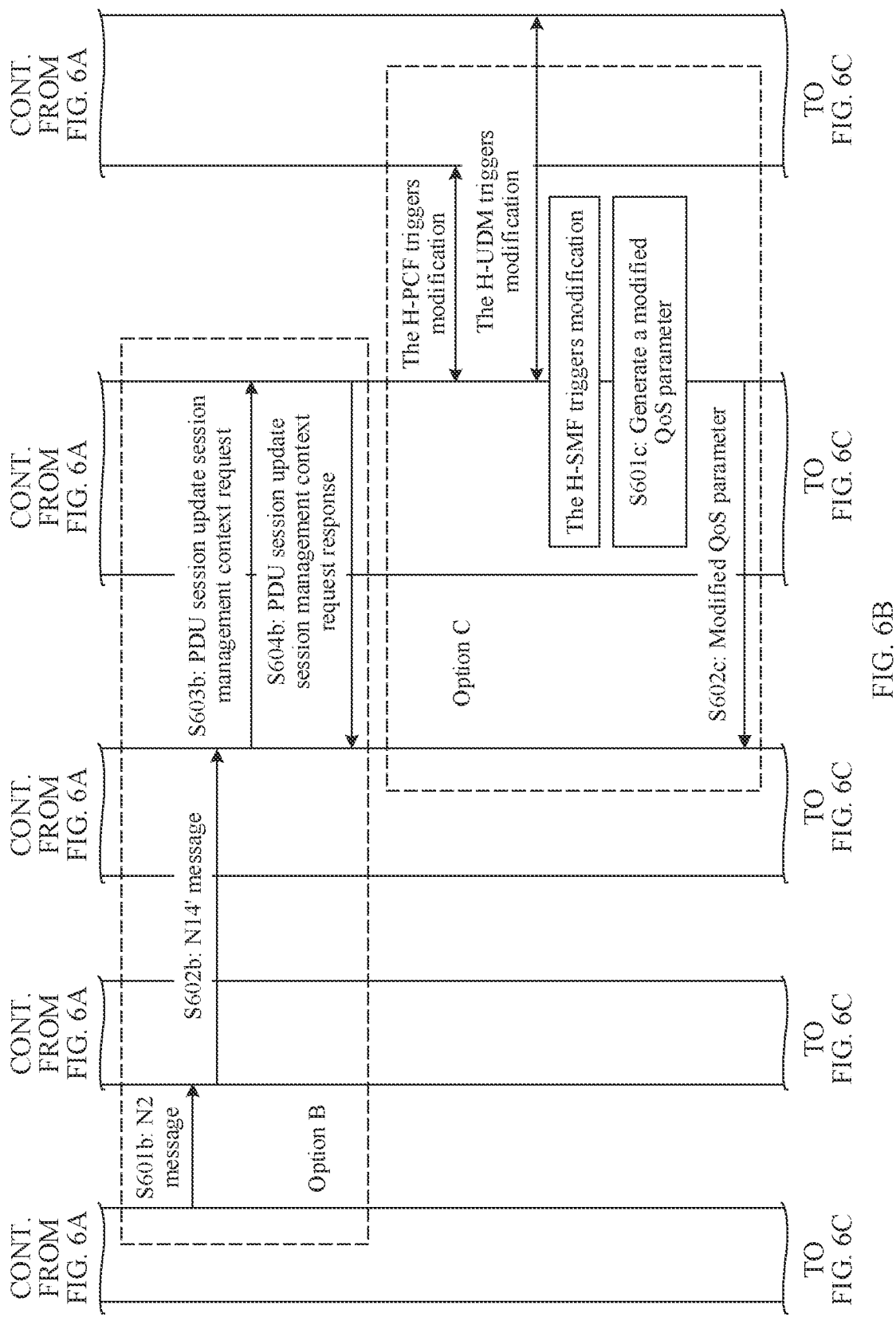

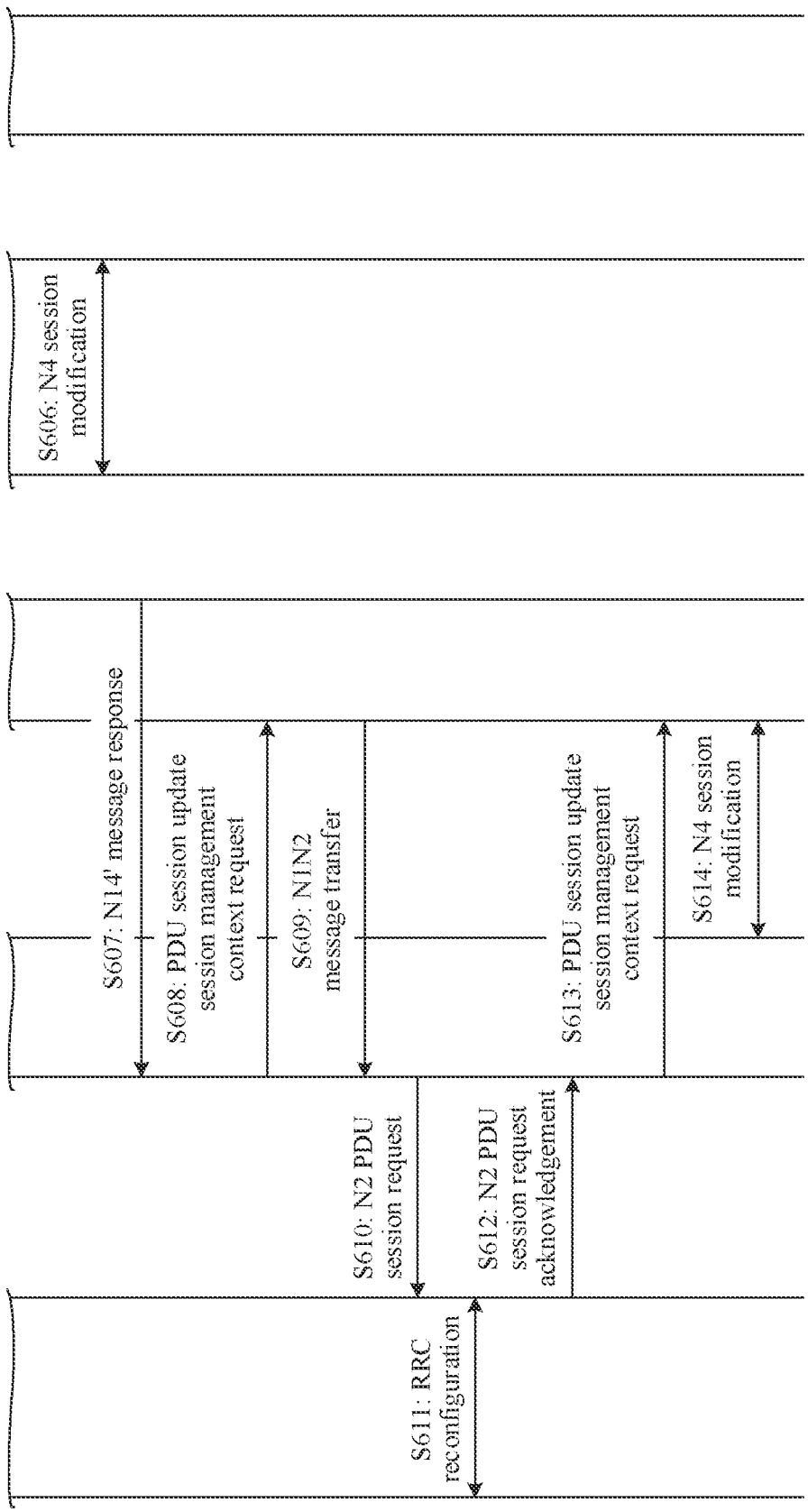

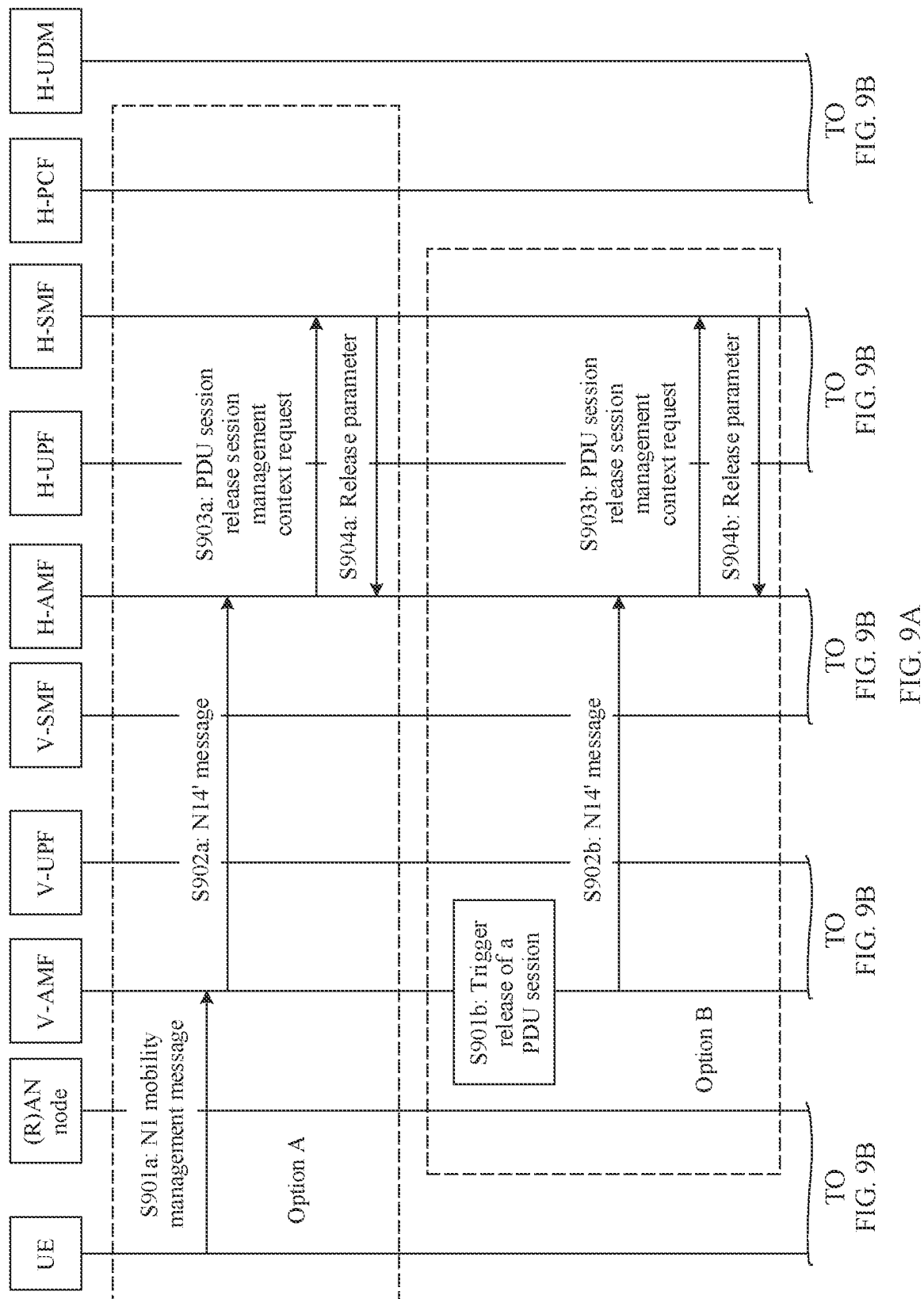

COMMUNICATIONS METHOD AND APPARATUS

CROSS-REFERENCE TO RELATED APPLICATIONS

This application is a continuation of International Application No. PCT/CN2019/104968, filed on Sep. 9, 2019, which claims priority to Chinese Patent Application No. 201811161320.X, filed on Sep. 30, 2018. The disclosures of the aforementioned applications are hereby incorporated by reference in their entireties.

TECHNICAL FIELD

This application relates to the field of communications technologies, and in particular, to a communications method and apparatus.

BACKGROUND

In a future 5th generation (5G) mobile communications system, vertical industry is a very important field, for example, the internet of things (IoT), machine to machine (M2M), and industry 4.0. There are a large quantity of private enterprises in the vertical industry. These private enterprises expect to use fast and reliable 3rd generation partnership project (3GPP) technologies to implement coverage in enterprise campuses, and expect to manage and control mobile devices in the enterprise campuses, for example, manage user subscription, protect user privacy, and protect private network service data security, without depending on networks of operators. A possible solution is as follows: A private enterprise autonomously deploys an enterprise private network to implement network coverage in an enterprise campus.

However, to implement interworking between the enterprise private network and an operator public network, a public network operator strongly requires a private network user to register with the public network. To be specific, a unified data management (UDM) entity of the public network manages and controls subscription of the private network user. The requirement of the public network operator definitely goes against expectation of the private enterprise for the enterprise private network.

To resolve the foregoing problem, an architecture for interworking between a public network and a private network is defined in the prior art: The enterprise private network and the operator public network are interconnected through a core network. In addition, to protect security of both parties, a unified proxy server may be used as a routing node for both parties. However, based on the foregoing architecture for interworking between a public network and a private network, how to perform communication between the enterprise private network and the operator public network needs to be further discussed.

SUMMARY

According to a first aspect, a communications method and apparatus are provided. The method may be applied to a terminal device, and include: The terminal device generates a first message, where the first message is used to request to establish a protocol data unit PDU session home-routed to a first network; and the terminal device sends the first message to a first access and mobility management function AMF entity, where the first AMF entity is a network element in a second network.

According to the foregoing solution, when the terminal device is located in a service area of the second network, the second network may send, through a RAN node in the second network, a request for establishing the PDU session home-routed to the first network. Through the PDU session, the terminal device can use a data service provided by the first network. For example, the second network may be a private network and the first network may be a public network, or the second network is a public network and the first network is a private network.

In a possible implementation, the first message includes first indication information, and the first indication information is used to indicate that the PDU session is a PDU session home-routed to the first network.

In a possible implementation, the first indication information includes at least one of a data network name, slice selection information, network type indication information, or identifier information of the first network. The first AMF entity may determine, by using the data network name, the slice selection information, the network type indication information, or the identifier information of the first network, that the PDU session that the terminal device requests to establish is used for local breakout or home routing. The home routing may also be referred to as "not allowing local breakout".

In a possible implementation, the first message includes at least one of a data network name or slice selection information. For the foregoing possible implementation, in an application scenario, the first message does not include the first indication information, but includes only the data network name or the slice selection information. The first AMF entity may determine, by using the data network name or the slice selection information, that the PDU session that the terminal device requests to establish is used for local breakout or home routing. Compared with those in the solution in which the first indication information is added to the first message, signaling overheads can be reduced.

According to a second aspect, a communications method is provided. The method may be applied to a first AMF entity, and include: The first access and mobility management function AMF entity receives a first message from a terminal device, where the first message is used to request to establish a protocol data unit PDU session home-routed to a first network; the first AMF entity sends a second message to a first session management function SMF entity based on the first message, where the second message is used to request core network tunnel information of the PDU session; and the first AMF entity receives first core network tunnel information from the first SMF entity, and sends the first core network tunnel information to a second AMF entity, where the first core network tunnel information is used to establish a data channel, of the PDU session, between a first user plane function UPF entity and a UPF entity in the first network. The first AMF entity, the first SMF entity, and the first user plane function UPF entity are network elements in a second network, and the second AMF entity is a network element in the first network.

According to the foregoing solution, the terminal device requests the AMF entity in the second network to establish the PDU session routed to the first network. The AMF entity in the second network requests the first core network tunnel information of the PDU session from the SMF entity in the second network based on the request, and sends the first core network tunnel information to the AMF entity in the first network. The AMF entity in the first network sends the first core network tunnel information to the UPF entity in the first network through an SMF entity in the first network, and obtains second core network tunnel information of the PDU session from the UPF entity in the first network. Further, the AMF entity in the first network sends the second core network tunnel information to the UPF entity in the second network through the AMF entity and the SMF entity in the second network, so that the PDU session is successfully established between the UPF entity in the first network and the UPF entity in the second network. In other words, the PDU session between the UPF entities in the two networks is successfully established through a communications interface between the AMF entities in the two networks, thereby resolving a problem of communication between a public network and a private network.

In a possible implementation, the first message includes first indication information, and the first indication information is used to indicate that the PDU session is a PDU session home-routed to the first network.

In a possible implementation, the first indication information includes at least one of a data network name, slice selection information, network type indication information, or identifier information of the first network.

In a possible implementation, the second message includes second indication information.

In a possible implementation, the first message includes a data network name and/or slice selection information, and the method further includes: The first AMF entity determines, based on a correspondence between indication information and a data network name and/or slice selection information, indication information corresponding to the data network name and/or the slice selection information in the first message; and when the indication information corresponding to the data network name and/or the slice selection information in the first message is used to indicate that the PDU session is not allowed to be used for local breakout, the first AMF entity determines, based on an identifier of the terminal device, that a home network of the PDU session is the first network; or the first AMF entity determines, based on a correspondence that is between a home-routed network identifier and a data network name and/or slice selection information and that is included in subscription information of the terminal device, that a home network of the PDU session is the first network.

According to the foregoing method, the first AMF entity may specifically determine the network to which the PDU session needs to be home-routed.

In a possible implementation, the second message includes second indication information. When the first network is a private network and the second network is a public network, the second indication information is used to indicate that a type of the PDU session requested to be established is a private network type, or when the first network is a public network and the second network is a private network, the second indication information is used to indicate that a type of the PDU session requested to be established is a public network type.

In a possible implementation, the method further includes: The first AMF entity selects a second SMF entity, where the second SMF entity is located in the first network.

In a possible implementation, the second message includes an identifier of the second SMF entity; and when the first network is the private network, the identifier of the second SMF entity is used to indicate that the second SMF entity is an SMF entity in the private network; or when the first network is the public network, the identifier of the second SMF entity is used to indicate that the second SMF entity is an SMF entity in the public network.

In a possible implementation, the method further includes: The first AMF entity sends at least one of the slice selection information, the data network name, a PDU session establishment request, or identifier information of the second network to the second AMF entity.

In a possible implementation, the method further includes: The first AMF entity receives second core network tunnel information from the second AMF entity, where the second core network tunnel information is used to establish the data channel, of the PDU session, between the first UPF entity and the second UPF entity in the first network; and the first AMF entity sends the second core network tunnel information to the first SMF entity.

In a possible implementation, the method further includes: The first AMF entity receives quality of service QoS parameter information of the PDU session from the second AMF entity; the first AMF entity sends the QoS parameter information of the PDU session to the first SMF entity; the first AMF entity receives a QoS profile and a QoS rule from the first SMF entity; the first AMF entity sends the QoS profile to a radio access network device; and the first AMF entity sends the QoS rule to the terminal device.

In a possible implementation, the second message is a context request for creating the PDU session, and the first core network tunnel information is carried in a context response for creating the PDU session, or the first core network tunnel information is carried in an N16' message transfer request.

According to a third aspect, a communications method is provided. The communications method is applied to a first SMF entity, and may include: The first session management function SMF entity receives a second message from a first access and mobility management function AMF entity, where the second message is used to request core network tunnel information of a protocol data unit PDU session; and the first SMF entity sends a first core network tunnel information to the first AMF entity based on the second message, where the first core network tunnel information is used to establish a data channel, of the PDU session, between a first user plane function UPF entity and a UPF entity in a first network. The first AMF entity, the first SMF entity, and the first UPF entity are network elements in a second network.

In a possible implementation, the second message includes second indication information. When the first network is a private network, the second indication information is used to indicate that a type of the PDU session requested to be established is a private network type, or when the first network is a public network, the second indication information is used to indicate that a type of the PDU session requested to be established is a public network type.

In a possible implementation, the second message includes the second indication information, and the second indication information is used to indicate that the type of the PDU session is the private network type or the public network type.

In a possible implementation, the second message includes an identifier of the second SMF entity; and when the first network is the private network, the identifier of the second SMF entity is used to indicate that the second SMF entity is an SMF entity in the private network; or when the first network is the public network, the identifier of the second SMF entity is used to indicate that the second SMF entity is an SMF entity in the public network.

In a possible implementation, the method further includes: The first SMF entity determines the first UPF entity based on the first indication information or the second indication information; the first SMF entity allocates the first core network tunnel information to the first UPF entity; and the first SMF entity sends the first core network tunnel information to the first UPF entity.

In a possible implementation, the method further includes: The first SMF entity receives second core network tunnel information from the first AMF entity, where the second core network tunnel information is used to establish the data channel, of the PDU session, between the first UPF entity and the second UPF entity in the first network; and the first SMF entity sends the second core network tunnel information to the first UPF entity.

In a possible implementation, the method further includes: The first SMF entity receives QoS parameter information from the first AMF entity; the first SMF entity obtains a QoS profile and a QoS rule of the PDU session based on the QoS parameter information; and the first SMF entity sends the QoS profile and the QoS rule to the first AMF entity.

In a possible implementation, the second message is a context request for creating the PDU session, and the first core network tunnel information is carried in a context response for creating the PDU session, or the first core network tunnel information is carried in an N16' message transfer request.

According to a fourth aspect, a communications method is provided. The communications method may be applied to a second AMF entity, and include: The second access and mobility management function AMF entity receives first core network tunnel information from a first AMF entity, where the first core network tunnel information is used to establish a data channel, of a protocol data unit PDU session, between a first user plane function UPF entity and a UPF entity in a first network; and the second AMF entity sends the first core network tunnel information to a second session management function SMF entity. The second AMF entity and the second SMF entity are network elements in the first network, and the first AMF entity and the first UPF entity are network elements in a second network.

In a possible implementation, the method further includes: The second AMF entity sends third indication information to the second SMF entity, where the third indication information is used to indicate that the PDU session is a PDU session home-routed from the second network to the first network.

In a possible implementation, the third indication information includes identifier information of the second network.

In a possible implementation, the method further includes: The second AMF entity receives second core network tunnel information from the second SMF entity, where the second core network tunnel information is used to establish the data channel, of the PDU session, between the first UPF entity and the second UPF entity in the first network; and the second AMF entity sends the second core network tunnel information to the first AMF entity.

In a possible implementation, the method further includes: The second AMF entity receives QoS parameter information of the PDU session from the second SMF entity; and the second AMF entity sends the QoS parameter information of the PDU session to the first AMF entity.

In a possible implementation, the second message is a context request for creating the PDU session, and the first core network tunnel information is carried in a context response for creating the PDU session, or the first core network tunnel information is carried in an N16' message transfer request.

In a possible implementation, the first core network tunnel information is carried in a context request for creating the PDU session; and the second core network tunnel information is carried in a context response for creating the PDU session, or the second core network tunnel information is carried in an N16' message transfer request.

According to a fifth aspect, a communications method is provided. The communications method may be applied to a second SMF entity, and include: The second session management function SMF entity receives first core network tunnel information from a second access and mobility management function AMF entity, where the first core network tunnel information is used to establish a data channel, of a protocol data unit PDU session, between a first user plane function UPF entity and a UPF entity in a first network; and the second SMF entity sends second core network tunnel information to the second AMF entity, where the second core network tunnel information is used to establish the data channel, of the PDU session, between the first UPF entity and the second UPF entity. The first UPF entity is a network element in a second network, and the second AMF entity, the second SMF entity, and the second UPF entity are network elements in the first network.

In a possible implementation, the method further includes: The second SMF entity receives third indication information from the second AMF entity, where the third indication information is used to indicate that the PDU session is a PDU session home-routed from the second network to the first network.

In a possible implementation, the third indication information includes identifier information of the second network.

In a possible implementation, the method further includes: The second SMF entity determines the second UPF entity based on the third indication information; the second SMF entity allocates the second core network tunnel information to the second UPF entity; and the second SMF entity sends the second core network tunnel information to the second UPF entity.

In a possible implementation, the method further includes: The second SMF entity sends QoS parameter information to the second AMF entity.

In a possible implementation, the first core network tunnel information is carried in a context request for creating the PDU session; and the second core network tunnel information is carried in a context response for creating the PDU session, or the second core network tunnel information is carried in an N16' message transfer request.

According to a sixth aspect, a communications apparatus is provided. The apparatus has a function of implementing behavior of the terminal device in any one of the first aspect and the possible designs of the first aspect. The function may be implemented by hardware, or may be implemented by hardware executing corresponding software. The hardware or software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the first aspect and the possible designs of the first aspect.

In a possible design, the apparatus further includes a transceiver, configured to perform communication between the apparatus and another network element.

In a possible design, the apparatus is a terminal device.

According to a seventh aspect, a communications apparatus is provided. The apparatus has a function of implementing behavior of the first AMF entity in any one of the second aspect and the possible designs of the second aspect. The function may be implemented by hardware, or may be implemented by hardware executing corresponding software. The hardware or software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the second aspect and the possible designs of the second aspect.

In a possible design, the apparatus further includes a transceiver, configured to perform communication between the apparatus and another network element.

In a possible design, the apparatus is a first AMF entity.

According to an eighth aspect, a communications apparatus is provided. The apparatus has a function of implementing behavior of the first SMF entity in any one of the third aspect and the possible designs of the third aspect. The function may be implemented by hardware, or may be implemented by hardware executing corresponding software. The hardware or software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the third aspect and the possible designs of the third aspect.

In a possible design, the apparatus further includes a transceiver, configured to perform communication between the apparatus and another network element.

In a possible design, the apparatus is a first SMF entity.

According to a ninth aspect, a communications apparatus is provided. The apparatus has a function of implementing behavior of the second AMF entity in any one of the fourth aspect and the possible designs of the fourth aspect. The function may be implemented by hardware, or may be implemented by hardware executing corresponding software. The hardware or software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the fourth aspect and the possible designs of the fourth aspect.

In a possible design, the apparatus further includes a transceiver, configured to perform communication between the apparatus and another network element.

In a possible design, the apparatus is a second AMF entity.

According to a tenth aspect, a communications apparatus is provided. The apparatus has a function of implementing behavior of the second SMF entity in any one of the fifth aspect and the possible designs of the fifth aspect. The function may be implemented by hardware, or may be implemented by hardware executing corresponding software. The hardware or software includes one or more modules corresponding to the foregoing function.

In a possible design, the apparatus may be a chip or an integrated circuit.

In a possible design, the apparatus includes a memory and a processor. The memory stores a group of programs. The processor is configured to execute the programs stored in the memory. When the programs are executed, the apparatus may perform the method according to any one of the fifth aspect and the possible designs of the fifth aspect.

In a possible design, the apparatus further includes a transceiver, configured to perform communication between the apparatus and another network element.

In a possible design, the apparatus is a second SMF entity.

According to an eleventh aspect, a chip is provided. The chip is connected to a memory or the chip includes a memory, and is configured to read and execute a software program stored in the memory, to implement the method according to any one of the foregoing aspects and the possible designs of the foregoing aspects.

According to a twelfth aspect, a communications system is provided. The communications system includes apparatuses according to any two or more of the first aspect to the fifth aspect.

According to a thirteenth aspect, a computer storage medium is provided. The computer storage medium stores a computer program, and the computer program includes an instruction used to perform the method in any one of the foregoing aspects and the possible designs of the foregoing aspects.

According to a fourteenth aspect, a computer program product is provided. When a computer reads and executes the computer program product, the computer is enabled to perform the method in any one of the foregoing aspects and the possible designs of the foregoing aspects.

BRIEF DESCRIPTION OF DRAWINGS

FIG. 3A to FIG. 3C are a schematic flowchart of a communications method according to an embodiment of this application;

FIG. 6A to FIG. 6C are a schematic flowchart of a communications method according to an embodiment of this application;

FIG. 9A to FIG. 9C are a schematic flowchart of a communications method according to an embodiment of this application;

DESCRIPTION OF EMBODIMENTS

Figure 1A:
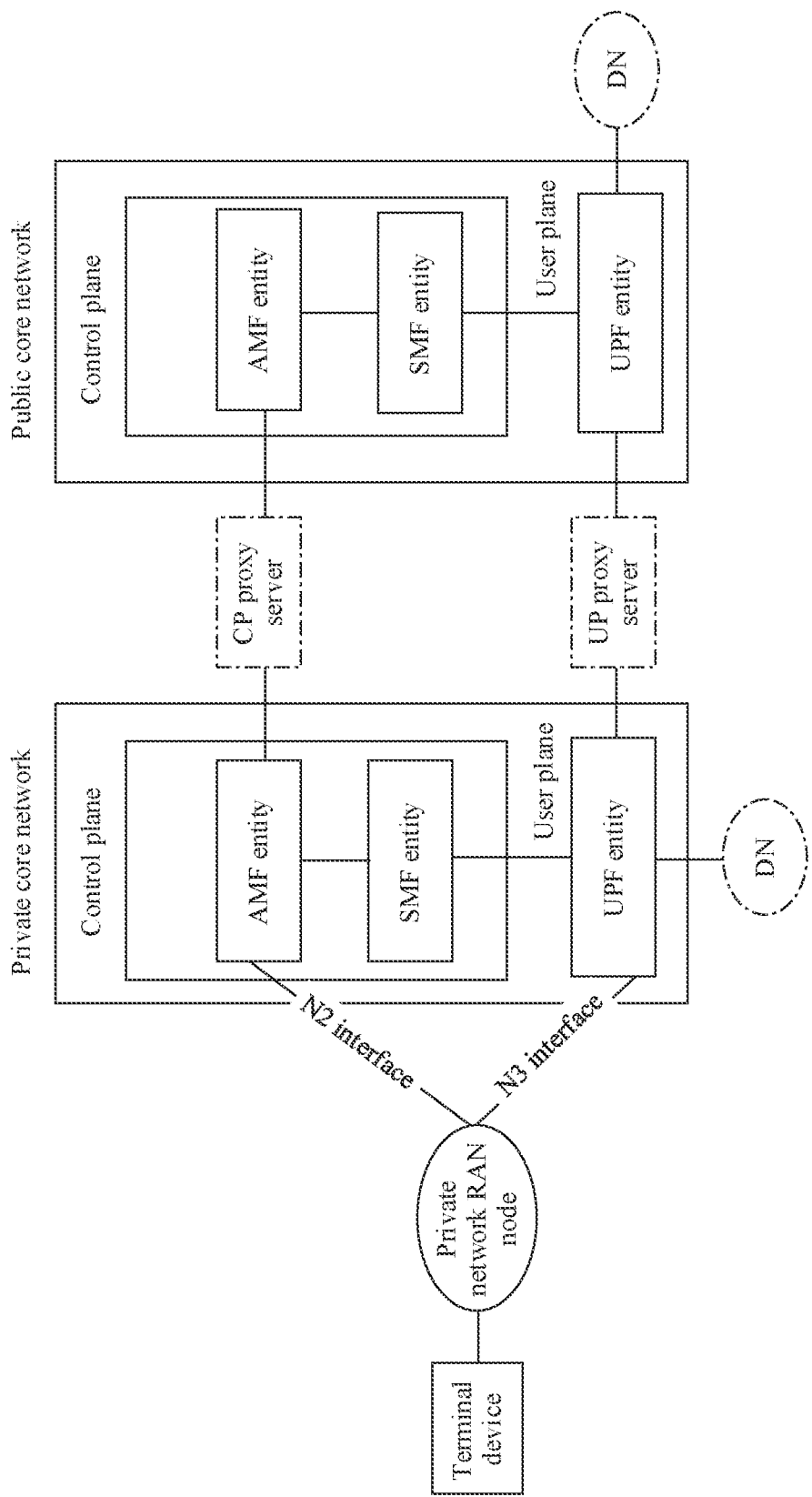
FIG. 1A and FIG. 1B show network architectures according to an embodiment of this application.

For ease of understanding, descriptions of concepts related to this application are provided as examples for reference, and details are as follows:

(1) A terminal device is a device that provides voice and/or data connectivity for a user, and may be specifically user equipment (UE), a mobile station (MS), a mobile terminal (MT), or the like, for example, a handheld device or a vehicle-mounted device that has a wireless connection function. Currently, some examples of the terminal include a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, or a wireless terminal in a smart home.

(2) A radio access network (RAN) may include one or more RAN nodes, for example, a 5G-RAN node or a base station in a future evolved system. The RAN node may implement functions such as a wireless physical layer, resource scheduling, radio resource management, radio access control, and mobility management. For example, the RAN node may be connected to a user plane function (UPF) entity through an N3 interface, and is configured to transmit data of a terminal device. For another example, the RAN node may be connected to an access and mobility management function (AMF) entity through an N2 interface, and is configured to establish a control plane signaling connection, to implement functions such as radio access bearer control.

(3) A private network is deployed by an enterprise to meet requirements such as enterprise privacy protection, communication security, user subscription management and control, and exclusive use of network resources. A control plane of the private network may include an AMF entity and a session management function (SMF) entity. A user plane may include a UPF entity. Optionally, the private network may further include network elements such as a UDM entity and an authentication server function (AUSF) entity.

(4) A public network may be a network of an operator. A control plane may include an AMF entity and an SMF entity. A user plane may include a UPF entity. Optionally, the public network further includes network elements such as a UDM entity, an AUSF entity, a policy control function (PCF) entity, a network slice selection function (NSSF) entity, and a network function repository function ((NF) repository function, NRF) entity.

(5) An AMF entity is mainly responsible for mobility management, access management, and the like, for example, responsible for terminal status information maintenance and management, terminal authentication, network slice selection, or SMF entity selection. Specifically, the AMF entity may be configured to implement a function other than session management in functions of a mobility management entity (MME) in a 4G system.

(6) An SMF entity is mainly responsible for control plane functions related to session management of a terminal device, for example, UPF entity selection, IP address allocation, session QoS management, and obtaining a policy and charging control (PCC) policy from a PCF entity.

(7) A UPF entity serves as an anchor point of a PDU session connection, and is mainly responsible for data packet filtering, data transmission/forwarding, rate control, charging information generation, and the like of a terminal device.

It should be understood that, in descriptions of this application, words such as "first" and "second" are merely used for distinction and description, and shall not be understood as an indication or implication of relative importance or an indication or implication of an order.

In this application, "and/or" describes an association relationship for describing associated objects and represents that three relationships may exist. For example, A and/or B may represent the following three cases: Only A exists, both A and B exist, and only B exists. A and B each may be singular or plural.

In this application, at least one of a, b, or c may represent: a; b; c; a and b; a and c; b and c; or a, b, and c. Herein, a, b, and c each may be singular or plural.

The following describes the technical solutions in the embodiments of this application with reference to the accompanying drawings.

Figure 1B:
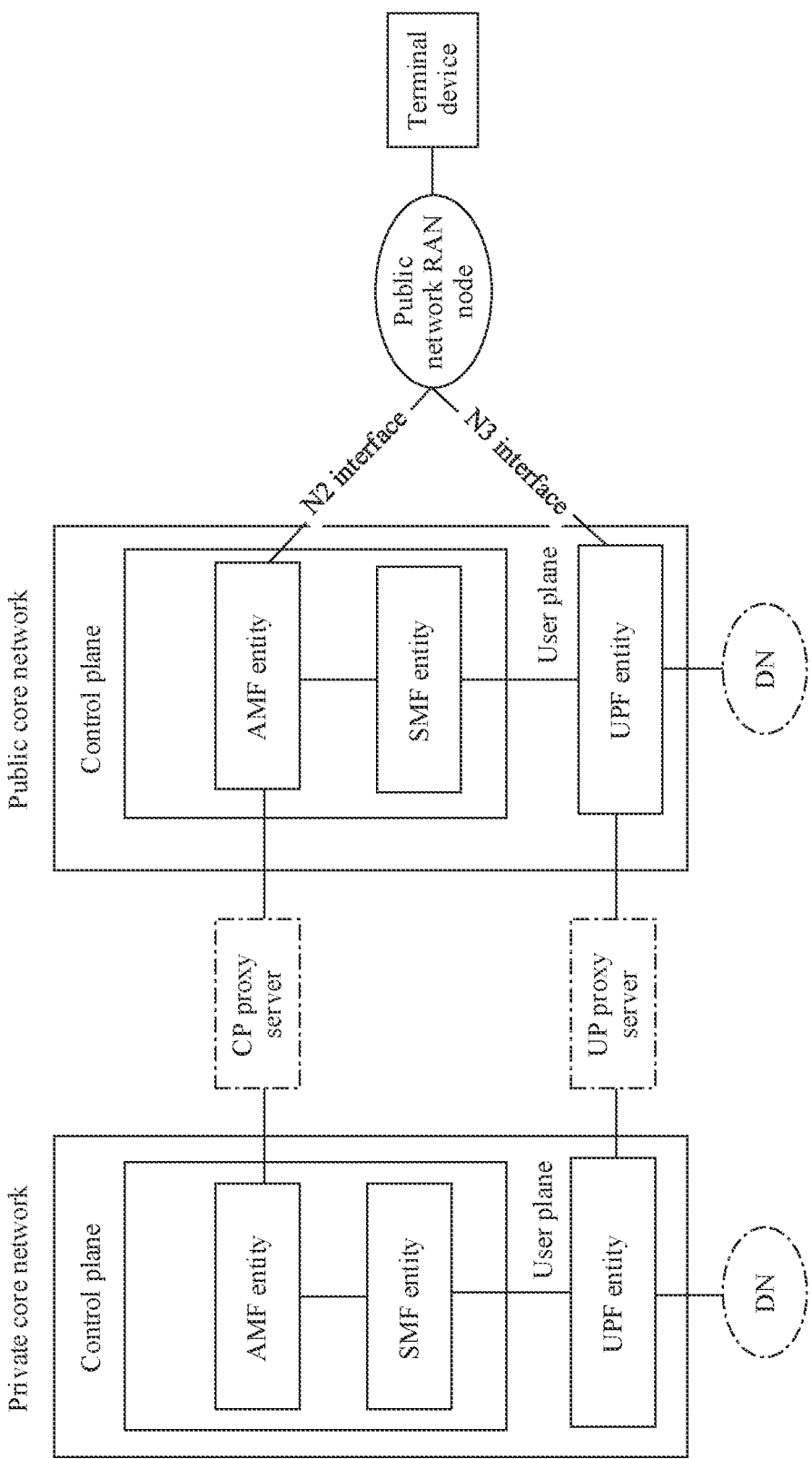

As shown in FIG. 1A or FIG. 1B, a network architecture is provided, and interworking between an enterprise private network and an operator public network may be implemented by using the network architecture.

As shown in FIG. 1A or FIG. 1B, on a control plane (CP), an AMF entity in the private network may directly communicate with an AMF entity in the public network. On a user plane (UP), a UPF entity in the private network may directly communicate with a UPF entity in the public network. Optionally, to protect privacy of a public network topology and a private network topology, in the network architecture shown in FIG. 1A, the AMF entity in the public network and the AMF entity in the private network may communicate with each other through a CP proxy (proxy) server. The UPF entity in the public network and the UPF entity in the private network may communicate with each other through a UP proxy server.

In the network architecture shown in FIG. 1A, a terminal device may be home-routed (home-routed) from the private network to the public network. Specifically, the terminal device may access the AMF entity in the private network through a RAN node in the private network, and interact with the AMF entity in the public network through the AMF entity in the private network, to establish a protocol data unit (PDU) session between the public network and the private network. The PDU session includes at least a data channel between the UPF entity in the private network and the UPF entity in the public network. Based on the PDU session, the terminal device may access the public network, so as to use a data service provided by the public network.

In the network architecture shown in FIG. 1B, a terminal device may be home-routed from the public network to the private network. Specifically, the terminal device may access the AMF entity in the public network through a RAN node in the public network, and interact with the AMF entity in the public network through the AMF entity in the private network, to establish a PDU session between the public network and the private network. The PDU session includes at least a data channel between the UPF entity in the private network and the UPF entity in the public network. Based on the PDU session, the terminal device may access the private network, so as to use a data service provided by the private network.

For FIG. 1A and FIG. 1B, a specific example is as follows: The terminal device may first register with both the public network and the private network, then establish the PDU session between the public network and the private network, and finally access the public network or the private network by using the PDU session. Optionally, the network architecture shown in FIG. 1A or FIG. 1B further includes a data network (DN). The DN may be connected to both the UPF entity in the public network and the UPF entity in the private network.

It should be noted that the network architectures shown in FIG. 1A and FIG. 1B are merely examples of network architectures in which a method or an apparatus provided in this application is used, and constitutes no limitation.

Figure 2:
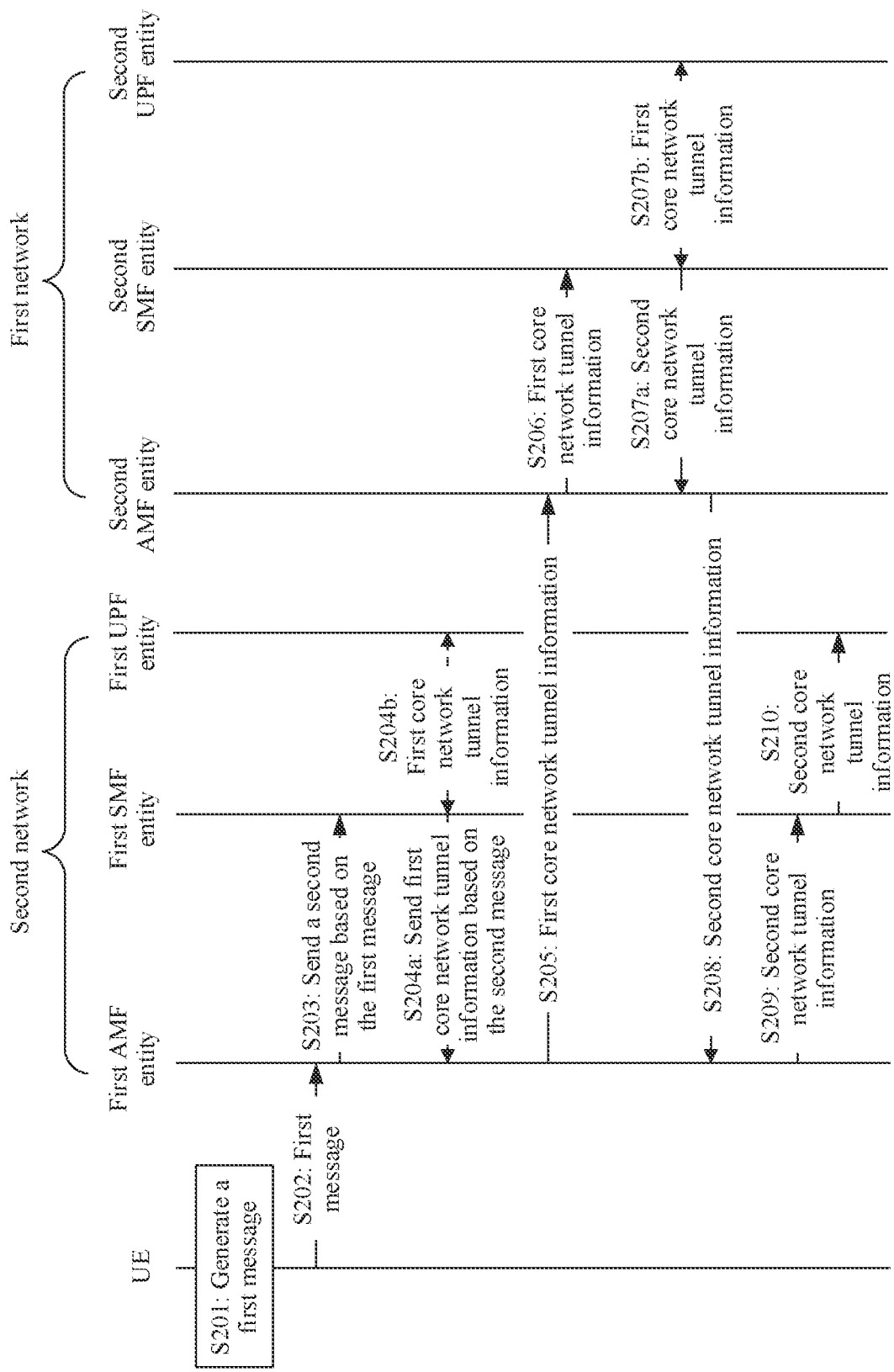
FIG. 2 is a schematic flowchart of a communications method according to an embodiment of this application.

As shown in FIG. 2, an embodiment of this application provides a communications method. The communications method may be used to establish a PDU session between a first network and a second network.

The first network may be the private network in the network architecture shown in FIG. 1B, and the second network may be the public network in the network architecture shown in FIG. 1B. Alternatively, the first network may be the public network in the network architecture shown in FIG. 1A, and the second network may be the private network in the network architecture shown in FIG. 1A. In addition, the second network may include a first AMF entity, a first SMF entity, and a first UPF entity, and the first network may include a second AMF entity, a second SMF entity, and a second UPF entity.

As shown in FIG. 2, a communication procedure may be specifically described as follows:

S201: A terminal device generates a first message.

The first message may be used to request to establish a PDU session home-routed to the first network, or may be used to request to establish a PDU session that carries a data service of the first network. The first message may be an existing message, for example, an uplink non-access stratum transport (uplink non-access stratum transport, UL NAS TRANSPORT) message, or may be a new message. This is not limited.

In an example, the first message is used to request to establish the PDU session home-routed to the first network.

Further, the first message may include first indication information, and the first indication information may be used to indicate that the PDU session is a PDU session home-routed to the first network.

In another example, the first message is used to request to establish the PDU session that carries the data service of the first network. Further, the first message may include first indication information, and the first indication information may be used to indicate that the PDU session is a PDU session that carries the data service of the first network.

The first indication information in the foregoing two examples may include at least one of the following information: a data network name (DNN), slice selection information, network type indication information, or identifier information of the first network.

For example, the first indication information is used to indicate to establish a PDU session home-routed to a public network, the network type indication information may be specifically used to indicate the public network, and the identifier information of the first network may be specifically identifier information of the public network.

The identifier information of the public network may be used to identify the public network. For example, the identifier information of the public network may be a public land mobile network identifier (PLMN ID). Specifically, the PLMN ID may include a mobile country code (MCC) and a mobile network code (MNC). A specific PLMN ID field is allocated to the public network. For example, a PLMN ID of China Mobile is 46000, and a PLMN ID of China Unicom is 46001. Herein, 460 is an MCC, and 00/01 is an MNC.

For another example, the first indication information is used to indicate to establish a PDU session home-routed to a private network, the network type indication information may be specifically used to indicate the private network, and the identifier information of the first network may be specifically identifier information of the private network.

The identifier information of the private network may be used to identify the private network. For example, the identifier information of the private network may be a PLMN ID. Specifically, the PLMN ID includes an MCC and a private mobile network code (private mobile network code, PMNC). A specific PLMN ID field is allocated to the private network. For example, a PLMN ID of an enterprise network of SANY Heavy Industry is 46056, and a PLMN ID of an enterprise network of China National Petroleum Corporation is 46057. Herein, 460 is an MCC, and 56/57 is a PMNC. Alternatively, for example, a network identifier of an enterprise private network includes a private network indication bit, used to indicate the private network. For example, the network identifier of the private network includes an MCC, the private network indication bit, and a PMNC. For example, a PLMN ID of an enterprise network of SANY Heavy Industry is 460156, and a PLMN ID of an enterprise network of China National Petroleum Corporation is 460157. Herein, 460 is an MCC, 1 is a private network indication bit, and 56/57 is a PMNC.

The slice selection information may be session management-network slice selection assistance information (S-NSSAI).

It should be noted that the first message may include no first indication information. In this case, the first message may include at least one of a data network name or slice selection information, and the data network name or the slice selection information may identify the first network.

Optionally, the first message includes a PDU session establishment request.

S202: The terminal device sends the first message to the first AMF entity.

S203: The first AMF entity sends a second message to the first SMF entity based on the first message.

The second message may be used to request core network tunnel information of the PDU session, and the core network tunnel information is used to establish a data channel between the first UPF entity and the second UPF entity. The second message may be an existing message, for example, a context request for creating a PDU session, or may be a newly created message. This is not limited.

In an example of this application, the first message includes the data network name and/or the slice selection information, and the first AMF entity may determine, based on the data network name and/or the slice selection information, a type of the PDU session requested to be established, determine second indication information based on the type of the PDU session requested to be established, and generate the second message based on the second indication information. The second message may include the second indication information.

For example, when the first network is a private network and the second network is a public network, the second indication information is used to indicate that the type of the PDU session requested to be established is a private network. Alternatively, when the first network is a public network and the second network is a private network, the second indication information is used to indicate that the type of the PDU session requested to be established is a public network.

In an example of this application, the first message may include the first indication information. After receiving the first message, the first AMF entity may obtain the first indication information from the first message, and generate the second message based on the obtained first indication information. The second message may include the first indication information.

In an example of this application, the first message may include the first indication information. After receiving the first message, the first AMF entity may obtain the first indication information from the first message, generate second indication information based on the first indication information, and generate the second message based on the first indication information and/or the second indication information.

The second message may include the first indication information and/or the second indication information.

Specifically, the first AMF entity may determine a type of the requested PDU session based on the data network name, the slice selection information, the network type indication information, and/or the identifier information of the first network that are/is in the first indication information, and determine the second indication information based on the type of the PDU session.

S204a: The first SMF entity sends first core network tunnel information to the first AMF entity based on the second message.

The first core network tunnel information may be used to establish the data channel, of the PDU session, between the first UPF entity and the UPF entity in the first network. For example, the first core network tunnel information is core network tunnel information of the PDU session on a first UPF entity side.

In an example, the second message includes the first indication information and/or the second indication information. The first SMF entity determines the first UPF entity based on the first indication information or the second indication information, allocates the first core network tunnel information to the first UPF entity, and sends the first core network tunnel information to the first AMF entity.

The first SMF entity may determine the first UPF entity based on the first indication information or the second indication information in the following two implementations.

In a possible implementation, the second indication information is used to indicate the type of the PDU session requested to be established. Further, the first SMF entity may determine, based on the second indication information, the type of the PDU session requested to be established, and select the first UPF entity from a UPF entity resource pool of the second network based on the type of the PDU session requested to be established, to implement communication between the first network and the second network through the first UPF entity. For example, if the second network is a public network, and the first network is a private network, the first SMF entity may select a UPF entity from a UPF entity resource pool of the public network, and further establish a connection between the selected UPF entity and a UPF entity in the private network, to implement communication between the private network and the public network.

In another possible implementation, the first message is used to request to establish the PDU session home-routed to the first network. Further, the first SMF entity may determine the type of the PDU session based on the data network name, the slice selection information, the network type indication information, and/or the identifier information of the first network that are/is in the first indication information, and select the first UPF entity from a UPF entity resource pool of the second network based on the type of the PDU session requested to be established, to implement communication between the first network and the second network.

In another example, the first SMF entity may select a UPF entity as the first UPF entity according to an existing method (for example, random selection or load-based selection), allocate the first core network tunnel information to the first UPF entity, and send the first core network tunnel information to the first AMF entity.

It should be noted that the first core network tunnel information may be allocated by the first SMF entity, or may be allocated by the first UPF entity. This is not intended to limit this application. If the first core network tunnel information is allocated by the first UPF entity, the first UPF entity sends the first core network tunnel information to the first SMF entity, and then the first SMF entity sends the first core network tunnel information to the first AMF entity by using S204a.

Optionally, when the first core network tunnel information is allocated by the first SMF entity, the method further includes S204b: The first SMF entity sends the first core network tunnel information to the first UPF entity.

S205: The first AMF entity sends the first core network tunnel information to the second AMF entity.

Optionally, the method further includes: The first AMF entity sends at least one of the slice selection information, the data network name, the PDU session establishment request, or identifier information of the second network to the second AMF entity.

The identifier information of the second network is used to identify the second network, to notify the second AMF entity of the network that currently communicates with the second AMF entity.

It should be noted that the first core network tunnel information, the slice selection information, the data network name, the PDU session establishment request, and the identifier information of the second network may be carried in a same message, or may be separately carried in different messages. This is not limited in this application.

S206: The second AMF entity sends the first core network tunnel information to the second SMF entity.

Correspondingly, the second SMF entity receives the first core network tunnel information from the second AMF entity.

Optionally, the method further includes: The second AMF entity sends third indication information to the second SMF entity, and correspondingly, the second SMF entity receives the third indication information from the second AMF entity.

The third indication information may be used to indicate that the PDU session is a PDU session home-routed from the second network to the first network, or may be used to indicate that a visited public land mobile network (VPLMN) of the PDU session is of a private network type or a public network type. The third indication information may include the identifier information of the second network.

It should be noted that the first core network tunnel information and the third indication information may be carried in a same message, or may be carried in different messages.

S207a: The second SMF entity sends second core network tunnel information to the second AMF entity.

Correspondingly, the second AMF entity receives the second core network tunnel information from the second SMF entity.

The second core network tunnel information may be used to establish the data channel, of the PDU session, between the first UPF entity and the second UPF entity. For example, the second core network tunnel information is core network tunnel information of the PDU session on a second UPF entity side.

In an example, when the second AMF entity sends the third indication information to the second SMF entity, the second SMF entity may determine the second UPF entity based on the third indication information, and the second SMF entity allocates the second core network tunnel information to the second UPF entity, and sends the second core network tunnel information to the second AMF entity.

For example, when the first network is a public network and the second network is a private network, the third indication information may be used to indicate that the PDU session is a PDU session home-routed from the private network to the public network. After obtaining the third indication information, the second SMF entity may determine that the current PDU session is not a local route, and then may select, from a UPF entity resource pool, the second UPF entity that is specially used to communicate with the private network.

In another example, the second SMF entity may select a UPF entity as the second UPF entity according to an existing method (for example, random selection or load-based selection), allocate the second core network tunnel information to the second UPF entity, and send the second core network tunnel information to the second AMF entity.

Optionally, the method further includes S207b: the second SMF entity sends the first core network tunnel information or both the first core network tunnel information and the second core network tunnel information to the second UPF entity.

It should be noted that the second core network tunnel information may be allocated by the second SMF entity, or may be allocated by the second UPF entity. This is not limited. If the second core network tunnel information is allocated by the second UPF entity, the second UPF entity sends the second core network tunnel information to the second SMF entity, and then the second SMF entity sends the second core network tunnel information to the second AMF entity by using S207a. In this case, only the first core network tunnel information may be sent in S207b.

Optionally, the method further includes: The second SMF entity sends QoS parameter information of the PDU session to the second AMF entity.

Correspondingly, the second AMF entity receives the QoS parameter information of the PDU session from the second SMF entity.

The QoS parameter information may include a QoS rule (QoS rules), a QoS profile (QoS profiles), a QoS flow level QoS parameter (QoS flow level QoS parameters), and the like.

It should be noted that the second core network tunnel information and the QoS parameter information may be carried in a same message, or may be separately carried in different messages. This is not limited.

S208: The second AMF entity sends the second core network tunnel information to the first AMF entity.

Correspondingly, the first AMF entity receives the second core network tunnel information from the second AMF entity.

Optionally, the method further includes: The second AMF entity sends the quality of service (QoS) parameter information of the PDU session to the first AMF entity.

Correspondingly, the first AMF entity receives the QoS parameter information of the PDU session from the second AMF entity.

The second core network tunnel information and the QoS parameter information may be carried in a same message, or may be separately carried in different messages.

S209: The first AMF entity sends the second core network tunnel information to the first SMF entity.

Correspondingly, the first SMF entity receives the second core network tunnel information from the first AMF entity.

Optionally, the method further includes S210: the first SMF entity sends the second core network tunnel information to the first UPF entity.

Optionally, the method further includes: The first AMF entity sends the QoS parameter information of the PDU session to the first SMF entity.

Correspondingly, the first SMF entity receives the QoS parameter information from the first AMF entity.

Further, the first SMF entity may obtain the QoS profile and the QoS rule of the PDU session based on the QoS parameter information. The first SMF entity may send the QoS profile and the QoS rule to the first AMF entity. Correspondingly, the first AMF entity receives the QoS profile and the QoS rule from the first SMF entity. Then, the first AMF entity may send the QoS profile to a RAN node, and the first AMF entity may send the QoS rule to the terminal device.

Specifically, the QoS parameter information may include the QoS profile and the QoS rule. The first SMF entity may obtain the QoS profile and the QoS rule from the QoS parameter information.

Optionally, the second message in step S203 is specifically a context request for creating the PDU session, and the first core network tunnel information in step S204a is carried in a context response for creating the PDU session. Alternatively, the second message in step S203 is specifically a context request for creating the PDU session, and the first core network tunnel information in step S204a is carried in an N16' message transfer request.

Optionally, the first core network tunnel information in step S206 is carried in the context request for creating the PDU session, and the second core network tunnel information in step S207a is carried in the context response for creating the PDU session. Alternatively, the first core network tunnel information in step S206 is carried in the context request for creating the PDU session, and the second core network tunnel information in step S207a is carried in the N16' message transfer request.

Optionally, the method further includes: The first AMF entity selects the second SMF entity. Further, the second message may include an identifier of the second SMF entity.

When the first network is a private network, the second SMF entity is an SMF entity in the private network. The identifier of the second SMF entity may be specifically an identifier of the SMF entity in the private network.

According to the method provided in the foregoing embodiment, the terminal device requests the AMF entity in the second network to establish the PDU session routed to the first network. The AMF entity in the second network requests the first core network tunnel information of the PDU session from the SMF entity in the second network based on the request, and sends the first core network tunnel information to the AMF entity in the first network. The AMF entity in the first network sends the first core network tunnel information to the UPF entity in the first network through the SMF entity in the first network, and obtains the second core network tunnel information of the PDU session from the UPF entity in the first network. Further, the AMF entity in the first network sends the second core network tunnel information to the UPF entity in the second network through the AMF entity and the SMF entity in the second network, so that the PDU session is successfully established between the UPF entity in the first network and the UPF entity in the second network. In other words, the PDU session between the UPF entities in the two networks is successfully established through a communications interface between the AMF entities in the two networks, thereby resolving a problem of communication between the public network and the private network.

Optionally, in an implementation scenario of the foregoing embodiment, the first message includes the data network name and/or the slice selection information, and the method further includes:

the first AMF entity determines, based on a correspondence between indication information and a data network name and/or slice selection information, indication information corresponding to the data network name and/or the slice selection information in the first message; and when the indication information corresponding to the data network name and/or the slice selection information in the first message is used to indicate that the PDU session is not allowed to be used for local breakout, the first AMF entity determines a home network of the PDU session.

The correspondence may be a correspondence between indication information and a combination of a data network name and slice selection information, a correspondence between a data network name and indication information, or a correspondence between slice selection information and indication information. The correspondence may be configured on the first AMF entity, or may be configured in subscription data of the terminal device. The first AMF entity may obtain the correspondence from the subscription data of the terminal device. The first AMF entity may obtain the subscription data of the terminal device from a UDM entity.

In addition, the indication information is used to indicate whether the PDU session is allowed to be used for local breakout. Specifically, different values may be set to represent different meanings. For example, if the indication information is 1, it may indicate that the PDU session is not allowed to be used for local routing (local breakout). If the indication information is 0, it may indicate that the PDU session is allowed to be used for local breakout.

"Not allowing local breakout" may also be referred to as home routing, and specifically mean that the PDU session is home-routed to a home network of the terminal device. "Allowing local breakout" may also be referred to as non-homing routing, and specifically mean that the PDU session can be routed over a local network.

The first AMF entity may determine a home network of the PDU session in the following manners:

Manner 1: The first AMF entity determines, based on an identifier of the terminal device, that a home network of the PDU session is the first network.

The identifier of the terminal device may include a public land mobile network (PLMN) identifier, and the PLMN identifier may identify an operator public network to which the terminal device belongs. For example, when the first network is a public network, and the second network is a private network, the first AMF entity may determine a home operator public network based on the PLMN identifier of the terminal device. For example, the operator public network may be a network of China Mobile, a network of China Unicom, or a network of China Telecom.

Manner 2: The first AMF entity determines, based on a correspondence that is between a home-routed network identifier and a data network name and/or slice selection information and that is included in the subscription information of the terminal device, that a home network of the PDU session is the first network.

In the foregoing embodiment, in S201 and S202, the first AMF entity can determine that the PDU session that the terminal device requests to establish needs to be home-routed. In S203 and S204b, the first AMF entity can determine the core network tunnel information, on the first UPF entity side, of the PDU session that the terminal device requests to establish.

However, the first AMF entity cannot determine the home network of the PDU session. According to the foregoing method, the first AMF entity may specifically determine the network to which the PDU session needs to be home-routed.

In a scenario in which the terminal device roams in a 4G network, there is a solution of establishing a PDU session between a network visited by the terminal device and a home network of the terminal device. In this solution, the PDU session is established by using a communications interface between a visited SMF entity and a home SMF entity. However, in a 5G network, a communications interface is disposed between only AMF entities in two networks, and no communications interface is disposed between SMF entities in the two networks. The method provided in this embodiment of this application may be used to resolve a problem about how to establish a PDU session between two networks by using a communications interface between two AMF entities.

Figure 3A:
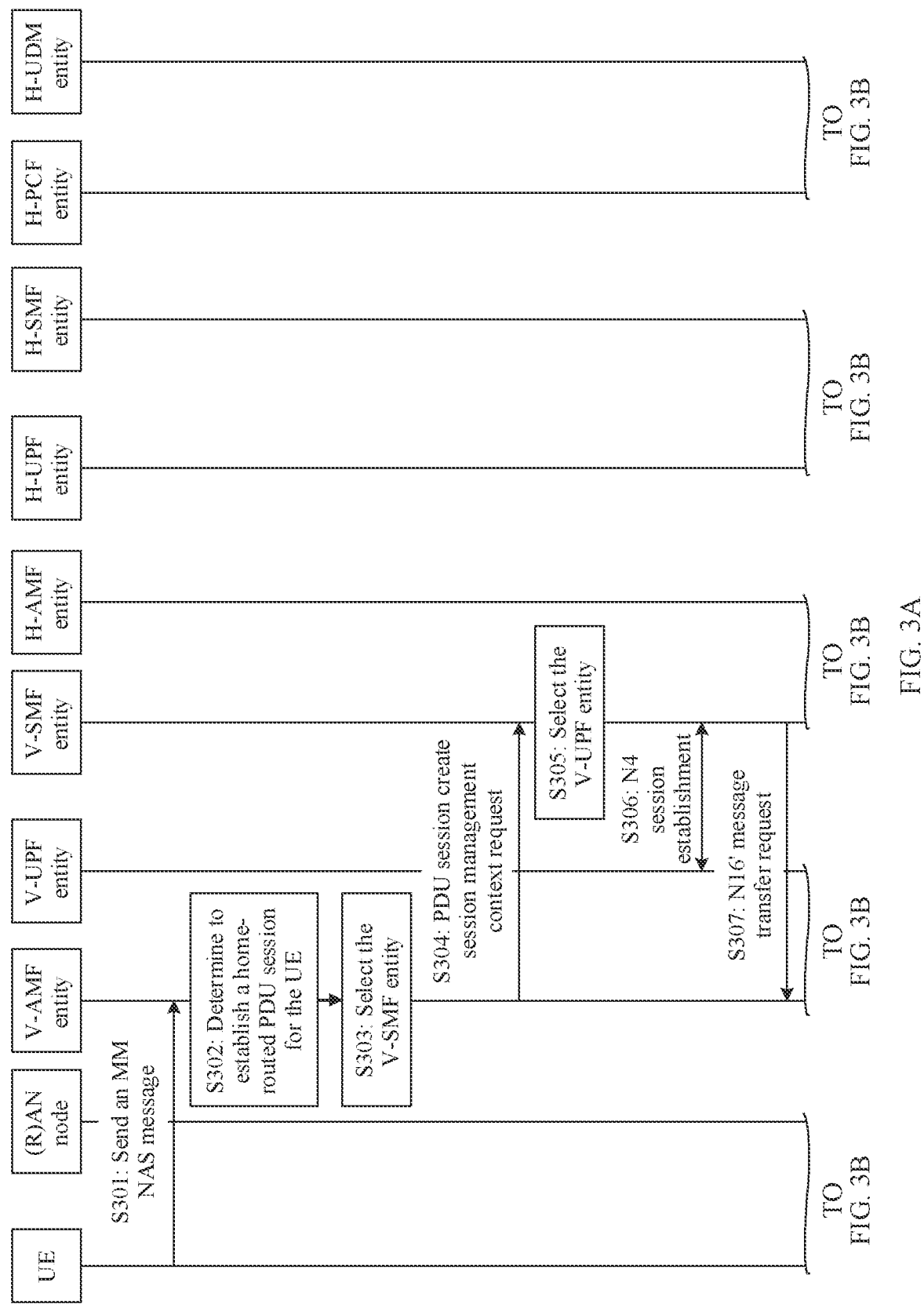
Figure 3B:
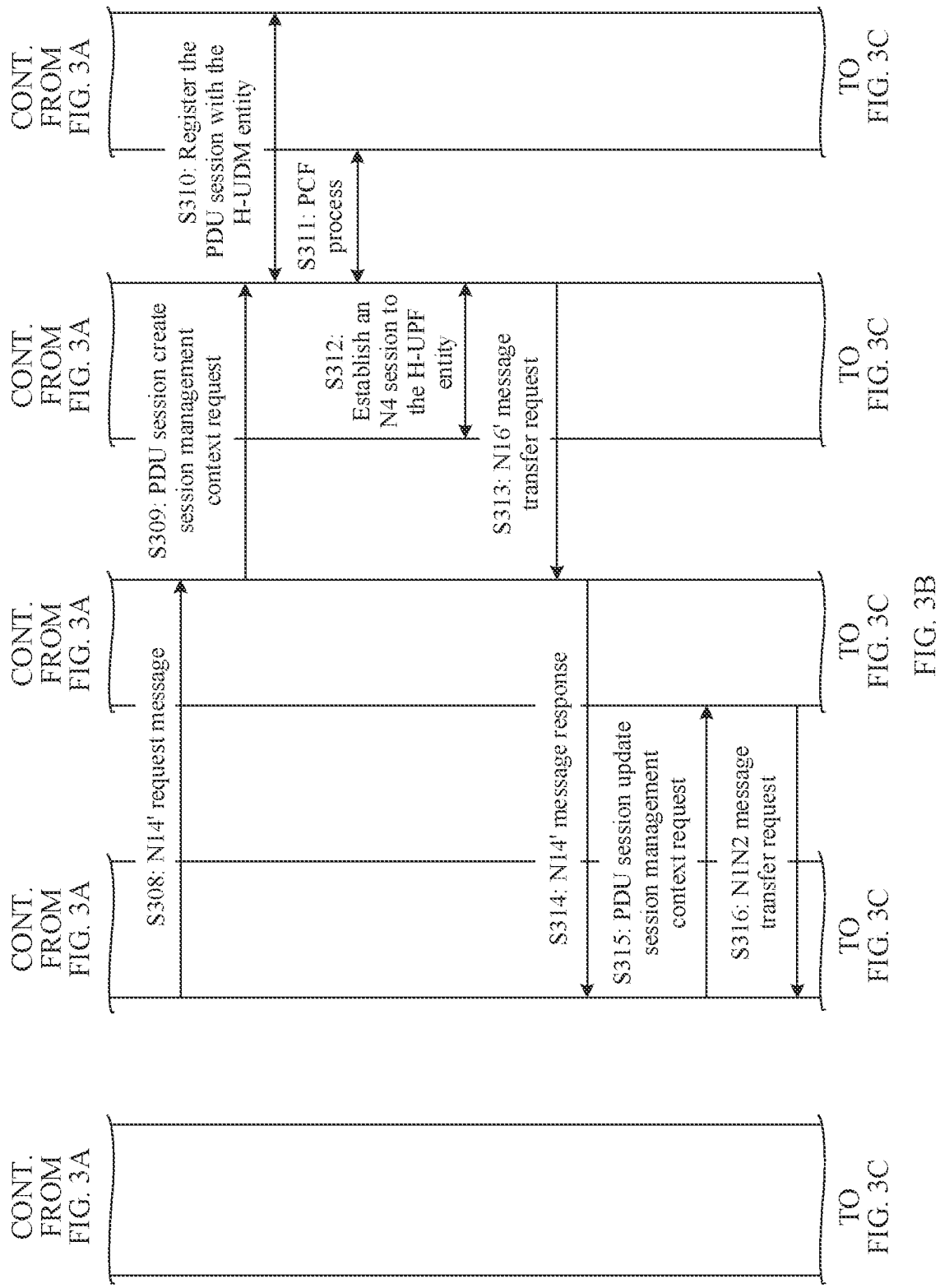

As shown in FIG. 3A to FIG. 3C, an embodiment of this application provides another communications method. The method is described by using an example in which a second network is a private network, a first AMF entity, a first UPF entity, and a first SMF entity in the second network are respectively a visit-AMF (V-AMF) entity, a visit-UPF (V-UPF) entity, and a visit-SMF (V-SMF) entity, a first network is a public network, a second AMF entity, a second UPF entity, and a second SMF entity in the first network are respectively a home-AMF (H-AMF) entity, a home-UPF (H-UPF) entity, and a home-SMF (H-SMF) entity, and a terminal device is UE. Details are as follows:

S301: The UE sends a mobility management non-access stratum (MM NAS) message to the V-AMF entity.

The MM NAS message may be an example of the first message in FIG. 2.

The MM NAS message may include a PDU session establishment request. For example, the MM NAS message may include a session management (SM) message, and the SM message may include the PDU session establishment request.

Optionally, the MM NAS message further includes at least one of S-NSSAI, a data network name DNN, a PDU session identifier (PDU Session ID), or a public PDU session indication.

Specifically, the MM NAS message may be an uplink non-access stratum transport (UL NAS TRANSPORT) message.

The PDU session establishment request may carry a PDU type and a session and service continuity mode (SSC mode). The PDU type may indicate that a PDU session is of an IPv4 type or an IPv6 type. The session and service continuity mode may indicate a session and service continuity mode of the PDU session. For example, the session and service continuity mode of the PDU session may be a mode 1, a mode 2, or a mode 3. The mode 1 means that an anchor (a UPF entity) of an IP address remains unchanged, and the mode 1 supports service continuity. The mode 2 means that an anchor (a UPF entity) of an IP address is changeable, and in a process of establishing a new PDU session for the terminal device, a network first releases an old PDU session of the terminal device, and then indicates the terminal device to establish the new PDU session. The mode 3 means that an anchor (a UPF entity) of an IP address is changeable, and in a process of establishing a new PDU session for the terminal device, a network first indicates the terminal device to establish the new PDU session, and then releases an old PDU session of the terminal device.

S302: The V-AMF entity determines to establish a PDU session that is home-routed for the UE.

In an example, the V-AMF entity may determine, based on at least one of the S-NSSAI, the data network name DNN, or the public PDU session indication in the MM NAS message, to establish the PDU session that is home-routed for the UE, but not establish a PDU session routed over a local network. The V-AMF entity may determine, based on at least one of the S-NSSAI, the data network name DNN, or the public PDU session indication, whether the PDU session that the UE requests to establish allows local breakout. If the V-AMF entity determines that the PDU session that the UE requests to establish does not allow local breakout, the V-AMF entity establishes the PDU session that is home-routed for the UE; or if the V-AMF entity determines that the PDU session that the UE requests to establish allows local breakout, the V-AMF entity establishes a local breakout PDU session for the UE.

S303: The V-AMF entity selects the V-SMF entity.

For example, the V-AMF entity may select the V-SMF entity based on network slice selection assistance information and/or the data network name.

Optionally, the method further includes: The V-AMF entity selects the H-SMF entity based on the network slice selection assistance information and/or the data network name.

S304: The V-AMF entity sends a PDU session create session management context request to the V-SMF entity.

The PDU session create session management context request may be a network element SMF PDU session create session management context request (Nsmf_PDUSession_Create SM Context Request). The PDU session create session management context request may be specifically an example of the second message in FIG. 2.

Optionally, the PDU session create session management context request carries the public PDU session indication.

S305: The V-SMF entity selects the V-UPF entity.

Optionally, the V-SMF entity selects a UPF entity from a UPF entity resource pool of a private network based on the public PDU session indication carried in the PDU session create session management context request. Communication with a public network can be implemented through the UPF entity.

S306: The V-SMF entity establishes an N4 session.

A process of establishing the N4 session may include: The V-SMF entity sends a request message to the V-UPF entity, and the V-UPF entity sends a response message of the request message to the V-SMF entity.

Visited core network tunnel information (visit core network (V-CN) tunnel info) may be allocated by the V-SMF entity, or may be allocated by the V-UPF entity. The visited core network tunnel information may also be referred to as private core network tunnel information. If the visited core network tunnel information is allocated by the V-SMF entity, the request message may carry the visited core network tunnel information. If the visited core network tunnel information is allocated by the V-UPF entity, the response message may carry the visited core network tunnel information.

S307: The V-SMF entity sends an N16' message transfer request to the V-AMF entity.

For example, the N16' message transfer request may be specifically a network element AMF communication N16' message transfer request (Namf_communication_N16' message transfer request).

The N16' message transfer request may carry the visited core network tunnel information. The visited core network tunnel information may be specifically an example of the first core network tunnel information shown in FIG. 2.

Alternatively, S307 may be as follows: The V-SMF entity sends a PDU session create session management context response to the V-AMF entity. For example, the PDU session create session management context response may be specifically a network element SMF PDU session create session management context response (Nsmf_PDU session_CreateSMContext response). The PDU session create session management context response carries the visited core network tunnel information.

S308: The V-AMF entity sends an N14' request message to the H-AMF entity.

The N14' request message may include at least one of the network slice selection assistance information, the data network name, the PDU session establishment request, or the visited core network tunnel information.

Optionally, the N14' request message further includes identifier information of the private network.

S309: The H-AMF entity sends a PDU session create session management context request to the H-SMF entity.

For example, the PDU session create session management context response may be specifically a network element SMF PDU session create session management context response.

The PDU session create session management context request may include one or more of the network slice selection assistance information, the data network name, the PDU session establishment request, or the visited core network tunnel information.

Optionally, the PDU session create session management context request further includes a VPLMN ID.

The VPLMN ID may be used to indicate that the PDU session is a PDU session home-routed from the private network to the public network, or the VPLMN ID is used to indicate that a type of the PDU session is a private network type. For example, some bits in the VPLMN ID may be used to indicate that a VPLMN is the private network.

It should be noted that if the N14' request message includes no identifier information of the private network, the V-AMF entity may identify, based on configuration information, a VPLMN ID of the network in which the V-AMF entity sending the N14' message is located, and then determine identifier information of the private network based on the VPLMN ID.

S310: The H-SMF entity registers the PDU session with the H-UDM entity, and obtains session management subscription information of the UE from the H-UDM entity.

For example, the session management subscription information of the UE may include a subscription permanent identifier (SUPI), NSSAI, DNN subscription information, or the like.

S311: The H-SMF entity performs a session management policy association establishment procedure (SM Policy Association Establishment procedure) with a PCF.

That the H-SMF entity performs a session management policy association establishment procedure with a PCF may include: The H-SMF entity obtains a PCC rule of the PDU session from the PCF entity.

It should be noted that both step S310 and step S311 are optional steps.

S312: The H-SMF entity establishes an N4 session to the H-UPF entity for the PDU session.

A process of establishing the N4 session may include: The H-SMF entity sends a request message to the H-UPF entity, and the H-UPF entity sends a response message of the request message to the H-SMF entity.

Home core network tunnel information (home core network (H-CN) tunnel info) may be allocated by the H-SMF entity, or may be allocated by the H-UPF entity. The home core network tunnel information may be an example of the second core network tunnel information in the procedure shown in FIG. 2.

It should be noted that if the home core network tunnel information is allocated by the H-SMF entity, the request message may carry the home core network tunnel information. If the home core network tunnel information is allocated by the H-UPF entity, the response message may carry the home core network tunnel information.

S313: The H-SMF entity sends an N16' message transfer request to the H-AMF entity.

The H-SMF entity may determine, based on the visited core network tunnel information carried in the PDU session create session management context request in step S309, that an N9 tunnel instead of an N3 tunnel needs to be established currently, and then return the N16' message transfer request to the H-AMF entity. Alternatively, the H-SMF entity may determine, based on the VPLMN ID carried in the PDU session create session management context request in step S309, that an N9 tunnel instead of an N3 tunnel needs to be established currently, and then return the N16' message transfer request to the H-AMF entity.

The N16' message transfer request may include one or more of the following information: a QoS rule (QoS Rules), a protocol configuration option (protocol configuration option, PCO), a selected PDU session type, an SSC mode, the home core network tunnel information (H-CN Tunnel Info), a QoS flow identifier (QFI), a QoS profile (QoS profiles), and an aggregate maximum bit rate (aggregated maximum bit rate, Session-AMBR).

Alternatively, S313 may be as follows: The H-SMF entity sends a PDU session create session management context response to the H-AMF entity. The PDU session create session management context response may include one or more of the following information: a QoS rule, a PCO, a selected PDU session type, an SSC mode, the home core network tunnel information, a QFI(s), a QoS profile, and a session-AMBR.

S314: The H-AMF entity sends an N14' message response to the V-AMF entity.

The N14' message response may include one or more of the QoS rule, the PCO, the selected PDU session type, the SSC mode, the home core network tunnel information, the QFI(s), the QoS profile, and the session-AMBR.

In an example, after receiving the N16' message transfer request in step S313, the H-AMF entity may obtain the foregoing parameters such as the QoS rule, the PCO, the selected PDU session type, the SSC mode, the home core network tunnel information, the QFI(s), the QoS profile, and the session-AMBR from the N16' message transfer request, then use the N14' message response to carry the foregoing parameters, and send the N14' message response to the V-AMF entity in step S314. Optionally, the foregoing parameters are separately used as information elements in the N14' message response.

In another example, after receiving the N16' message transfer request in step S313, the H-AMF entity may directly use the N14' message response to carry the N16' message transfer request, and send the N14' message response to the V-AMF entity in step S314.

S315: The V-AMF entity sends a PDU session update session management context request to the V-SMF entity.

For example, the PDU session update session management context request may be a network element SMF PDU session update session management context request (Nsmf_PDU Session_Update SM Context Request).

The PDU session update session management context request may include one or more of the QoS rule, the PCO, the selected PDU session type, the SSC mode, the home core network tunnel information, the QFI(s), the QoS profile, and the session-AMBR.

Optionally, the foregoing parameters are directly carried in the PDU session update session management context request, that is, the foregoing parameters may be separately used as information elements in the PDU session update session management context request. The foregoing parameters are sent by the V-AMF entity to the V-SMF entity in S315. Alternatively, the foregoing parameters may be carried in an N16' message transfer request, and the N16' message transfer request may be carried in the PDU session update session management context request. The foregoing parameters are also sent by the V-AMF entity to the V-SMF entity in S315.

S316: The V-SMF entity sends an N1N2 message transfer request to the V-AMF entity. For example, the N1N2 message transfer request may be a network element AMF communication N1N2 message transfer request (Namf_communication_N1N2 message transfer request).

The N1N2 message transfer request may include parameter information of the PDU session. For example, the parameter information of the PDU session may include N1 SM information sent to the UE and first N2 SM information sent to a RAN node. The N1 SM information may include a PDU session establishment accept (PDU Session Establishment Accept) message. For example, the PDU session establishment accept message may include an authorized QoS rule, the SSC mode, the S-NSSAI, an allocated IPv4 address, the session-AMBR, and the like. The first N2 SM information may include a PDU session identifier, the QoS profile, core network tunnel information, the S-NSSAI, the session-AMBR, and the like.

S317: The V-AMF entity sends an N2 PDU session request to the RAN node.

The N2 PDU session request may include the N1 SM information and the first N2 SM information.

S318: The RAN node performs RRC message exchange with the UE.

Through RRC message exchange between the RAN node and the UE, an air interface resource may be established for the PDU session, and the N1 SM information may be sent to the UE.

S319: The RAN node returns an N2 PDU session response to the V-AMF entity.

The N2 PDU session response may include the PDU session ID, a cause value Cause, and second N2 SM information. The second N2 SM information may include the PDU session ID, RAN tunnel information (tunnel Info), and a list of accepted/rejected QoS profiles (list of accepted/rejected QoS profiles).

S320: The V-AMF entity sends a PDU session update session management context request to the V-SMF entity. For example, the PDU session update session management context request may be a network element SMF PDU session update session management context request (Nsmf_PDU session_update SM context request).

The PDU session update session management context request may carry the second N2 SM information.

S321: The V-SMF entity sends an N4 session modification message to the V-UPF entity.

The N4 session modification message may include the RAN tunnel information.

S322: The V-SMF entity sends a PDU session update session management context response to the V-AMF entity. For example, the PDU session update session management context response may be a network element SMF PDU session update session management context response (Nsmf_PDU session_update SM context response).

In this embodiment of this application, the UE may send, to the AMF entity in the private network through a RAN node in the private network, the request for establishing the PDU session home-routed from the private network to the public network. The AMF entity in the private network may send a request to the AMF entity in the public network. In addition, the AMF entity in the private network allocates core network tunnel information on a private network UPF side to the PDU session, and the AMF entity in the public network may allocate core network tunnel information on a public network UPF side to the PDU session, so as to establish the PDU session between the public network and the private network.

Figure 4:
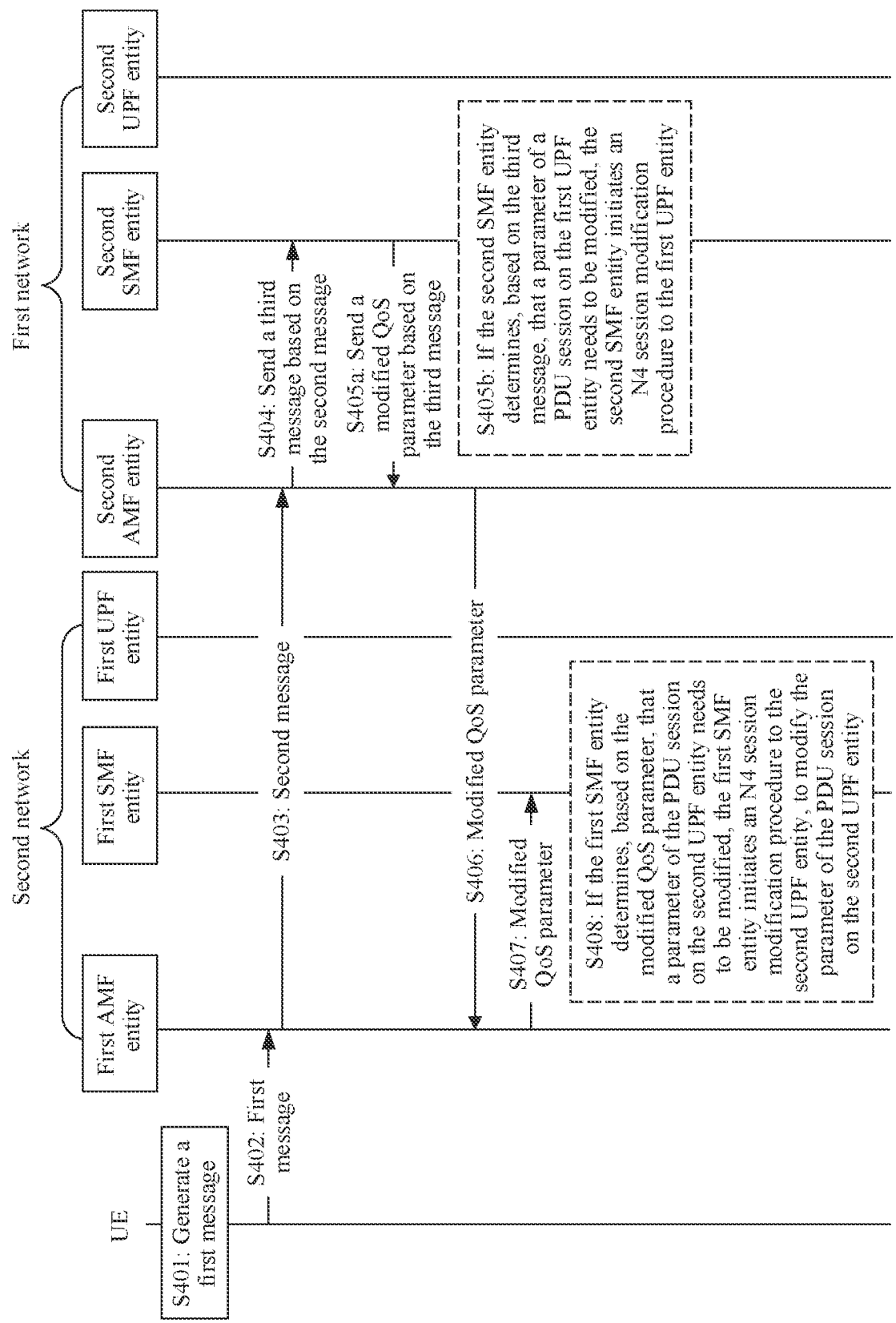
FIG. 4 is a schematic flowchart of a communications method according to an embodiment of this application.

As shown in FIG. 4, an embodiment of this application provides still another communications method. The communications method may be used to modify (modification) a PDU session between a first network and a second network. In the method, the first network may be the private network in the network architecture shown in FIG. 1B, and the second network may be the public network in the network architecture shown in FIG. 1B. Alternatively, the first network may be the public network in the network architecture shown in FIG. 1A, and the second network may be the private network in the network architecture shown in FIG. 1A. A terminal device may be UE. The method is specifically described as follows:

S401: The UE generates a first message.

The first message is used to request to modify a PDU session home-routed to the first network. The first message may be an existing message, for example, an uplink non-access stratum transport message, or may be a new message. This is not limited.

S402: The UE sends the first message to a first AMF entity.

The first message may include an N1 SM message. The N1 SM message may include a PDU session modification request.

It should be noted that an execution body of S401 and S402 may be replaced with a RAN node.

S403: The first AMF entity sends a second message to a second AMF entity.

Specifically, the first AMF entity may determine, based on stored information about the PDU session, whether the PDU session is a PDU session that needs to be home-routed to the first network, and send the second message to the second AMF entity if the PDU session is the PDU session that needs to be home-routed to the first network. The second message is used to request to modify the PDU session, and the second message includes the N1 SM message.

Optionally, after the PDU session is successfully established, the first AMF entity may mark the PDU session as the PDU session that needs to be home-routed to the first network.

S404: The second AMF entity sends a third message to a second SMF entity based on the second message.

The third message includes the N1 SM message, and the third message is used to request to modify the PDU session.

Optionally, after the PDU session is successfully established, the second AMF entity may mark the PDU session as the PDU session that needs to be home-routed to the first network.

Optionally, the third message may include second indication information, and the second indication information is used to indicate that the PDU session is a PDU session home-routed from the second network to the first network.

S405a: The second SMF entity sends a modified QoS parameter to the second AMF entity based on the third message.

The modified QoS parameter is used to modify a corresponding QoS parameter of the PDU session on at least one of a first SMF entity, a first UPF entity, the RAN node, and the UE.

Optionally, after the PDU session is successfully established, the second SMF entity may mark the PDU session as the PDU session that needs to be home-routed to the first network.

S405b: If the second SMF entity determines, based on the third message, that a parameter of the PDU session on the first UPF entity needs to be modified, the second SMF entity initiates an N4 session modification procedure to the first UPF entity.

The N4 session modification procedure is used to modify the parameter of the PDU session on the first UPF entity.

A sequence of S405a and S405b is not limited. In addition, step S405b is an optional step.

S406: The second AMF entity sends the modified QoS parameter to the first AMF entity.

S407: The first AMF entity sends the modified QoS parameter to the first SMF entity.

S408: If the first SMF entity determines, based on the modified QoS parameter, that a parameter of the PDU session on a second UPF entity needs to be modified, the first SMF entity initiates an N4 session modification procedure to the second UPF entity, to modify the parameter of the PDU session on the second UPF entity.

Step S408 is an optional step.

In the foregoing embodiment, the first SMF entity may obtain a modified QoS profile and QoS rule of the PDU session based on the modified QoS parameter information, the first SMF entity may send the QoS profile and the QoS rule to the first AMF entity, the first AMF entity may send the modified QoS profile to the RAN node, and the first AMF entity may send the modified QoS rule to the UE.

It can be learned from the foregoing that the UE or the RAN node may trigger modification of the PDU session, of the UE, home-routed from a private network to a public network.

Figure 5:
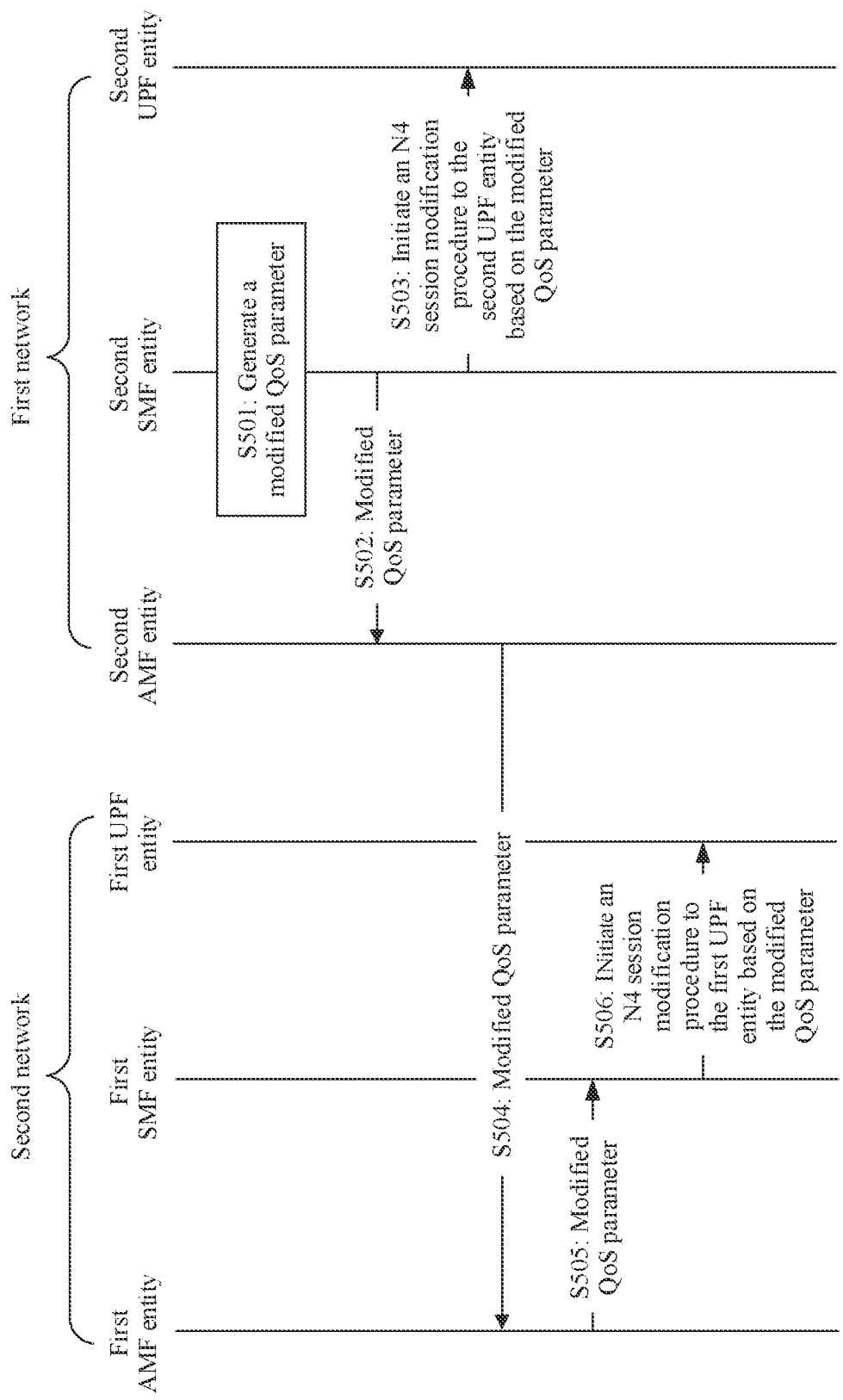
FIG. 5 is a schematic flowchart of a communications method according to an embodiment of this application.

As shown in FIG. 5, an embodiment of this application provides still another communications method. The communications method may be used to modify a PDU session between a first network and a second network. In the method, the first network may be the private network in the network architecture shown in FIG. 1B, and the second network may be the public network in the network architecture shown in FIG. 1B. Alternatively, the first network may be the public network in the network architecture shown in FIG. 1A, and the second network may be the private network in the network architecture shown in FIG. 1A. A terminal device may be UE. In this embodiment of this application, the first network may further include a second UDM entity. In this embodiment of this application, the second UDM entity may trigger an entire modification procedure, or a second UPF entity triggers an entire modification procedure, or a second SMF entity triggers an entire modification procedure. In a procedure shown in FIG. 5, an example in which the second SMF entity triggers the modification procedure is used for description, but this is not intended to limit this application. The method is specifically described as follows:

S501: The second SMF entity generates a modified QoS parameter, where the modified QoS parameter is used to modify a corresponding QoS parameter of the PDU session on at least one of a first SMF entity, a first UPF entity, a RAN node, and the UE.

S502: The second SMF entity sends the modified QoS parameter to a second AMF entity.

S503: The second SMF entity initiates an N4 session modification procedure to the second UPF entity based on the modified QoS parameter, to modify a parameter of the PDU session on the second UPF entity. A sequence of S502 and S503 is not limited.

S504: The second AMF entity sends the modified QoS parameter to a first AMF entity.

S505: The first AMF entity sends the modified QoS parameter to the first SMF entity.

S506: The first SMF entity initiates an N4 session modification procedure to the first UPF entity based on the modified QoS parameter, to modify a parameter of the PDU session on the first UPF entity.

Optionally, the first SMF entity may send, to the first AMF entity, a QoS profile and/or a QoS rule obtained from the modified QoS parameter.

In an implementation, the QoS profile may be carried in N2 SM info, the QoS rule may be carried in N1 SM info, and the N1 SM info and/or the N2 SM info may be carried in an N1N2 message and sent to the first AMF entity.

Optionally, after receiving the N1N2 message transfer request, the first AMF entity may send the QoS profile in the N1N2 message transfer request to the RAN node, and/or send the QoS rule to the UE.

It can be learned from the foregoing that in this embodiment of this application, the second SMF entity, the second UDM entity, or the second UPF entity may trigger modification of the PDU session home-routed from a private network to a public network.

Figure 6A:
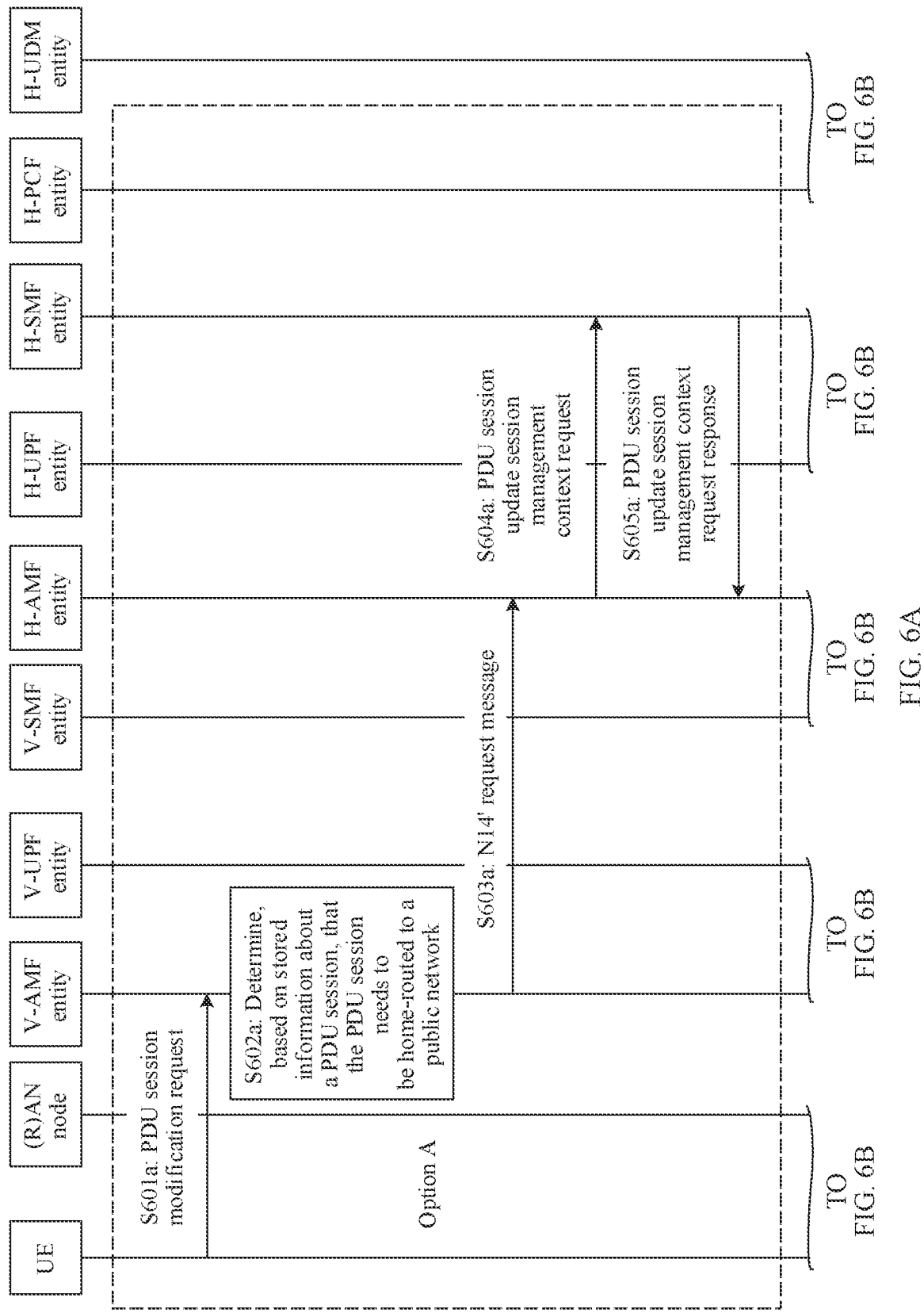

As shown in FIG. 6A to FIG. 6C, an embodiment of this application provides still another communications method. The method is described by using an example in which a second network is a private network, a first AMF entity, a first UPF entity, and a first SMF entity in the second network are respectively a V-AMF entity, a V-UPF entity, and a V-SMF entity, a first network is a public network, a second AMF entity, a second UPF entity, and a second SMF entity in the first network are respectively an H-AMF entity, an H-UPF entity, and an H-SMF entity, and a terminal device is UE.

In the communications method shown in FIG. 6A to FIG. 6C, the UE may trigger modification of a PDU session, a RAN node may trigger modification of a PDU session, or the H-SMF entity may trigger modification of a PDU session. In this embodiment, the foregoing three cases are described by using an option A, an option B, and an option C as examples. The option A may include S601a to S605a, the option B may include S601b to S604b, and the option C may include S601c and S602c.

The option A may be specifically as follows:

S601a: The UE sends a PDU session modification request to the V-AMF entity.

S602a: The V-AMF entity determines, based on stored information about the PDU session, that the PDU session needs to be home-routed to the public network.

Optionally, after the PDU session is successfully established, the V-AMF entity may mark the PDU session as a PDU session home-routed from the private network to the public network.

S603a: The V-AMF entity sends an N14' request message to the H-AMF entity.

The N14' request message includes a PDU session modification request, and the PDU session modification request is used to modify a QoS parameter of the PDU session.

S604a: The H-AMF entity sends a PDU session update session management context request to the H-SMF entity.

For example, the PDU session update session management context request may be a network element SMF PDU session update session management context request (Nsmf_PDU session_update SM context request), and the PDU session update session management context request may include a PDU session modification request.

Optionally, the PDU session update session management context request may further include indication information used to indicate that the PDU session is home-routed from the private network to the public network.

Optionally, after the PDU session is successfully established, the H-AMF entity may mark the PDU session as the PDU session home-routed from the private network to the public network.

S605a: The H-SMF entity sends a PDU session update session management context request response to the H-AMF entity.

The PDU session update session management context request response may be a network element SMF PDU session update session management context request response (Nsmf_PDU session_update SM context request response). The PDU session update session management context request response may include a modified QoS parameter, and the modified QoS parameter is used to modify a corresponding QoS parameter of the PDU session on at least one of the V-SMF entity, the V-UPF entity, the RAN node, and the UE.

Optionally, after the PDU session is successfully established, the H-SMF entity may mark the PDU session as the PDU session home-routed from the private network to the public network.

Alternatively, step S605a is as follows: The H-SMF entity sends an N16' message transfer request to the H-AMF entity. The N16' message transfer request carries the modified QoS parameter.

The option B is specifically as follows:

S601b: The RAN node sends an N2 message to the V-AMF entity, where the N2 message may include N2 SM information, a PDU session identifier, and the like.

S602b: The V-AMF entity sends an N14' message to the H-AMF entity.

The N14' message is used to request to modify the PDU session.

The N14' message may include the N2 SM information or both the N2 SM information and the PDU session identifier.

Optionally, after the PDU session is successfully established, the V-AMF entity may mark the PDU session as a PDU session home-routed from the private network to the public network.

S603b: The H-AMF entity sends a PDU session update session management context request to the H-SMF entity.

The PDU session update SM context request includes the N2 SM information.

Optionally, the PDU session update session management context request may further include indication information used to indicate that the PDU session is home-routed from the private network to the public network.

Optionally, after the PDU session is successfully established, the H-AMF entity may mark the PDU session as the PDU session home-routed from the private network to the public network.

S604b: The H-SMF entity sends a PDU session update session management context request response to the H-AMF entity.

The PDU session update session management context request response may include a modified QoS parameter. The modified QoS parameter is used to modify a corresponding QoS parameter of the PDU session on at least one of the first SMF entity, the first UPF entity, the RAN node, and the UE.

Optionally, after the PDU session is successfully established, the H-SMF entity may mark the PDU session as the PDU session home-routed from the private network to the public network.

Alternatively, step S604b is as follows: The H-SMF entity sends an N16' message transfer request to the H-AMF entity. The N16' message transfer request carries the modified QoS parameter.

It should be noted that the N16' message may also be referred to as an N16 message, and N16 and N16' may correspond to a same interface, for example, an interface between two SMF entities. The N14' message may also be referred to as an N14 message, and N14 and N14' may correspond to a same interface, for example, an interface between two AMF entities.

The option C is specifically as follows:

S601c: The H-SMF entity generates a modified QoS parameter.

In this embodiment of this application, an H-PCF entity may trigger an entire modification procedure, an H-UDM entity may trigger an entire modification procedure, or the H-SMF entity may trigger an entire modification procedure.

S602c: The H-SMF entity sends the modified QoS parameter to the H-AMF entity, where the modified QoS parameter is used to modify a corresponding QoS parameter of the PDU session on at least one of the first SMF entity, the first UPF entity, the RAN node, and the UE. Optionally, the modified QoS parameter may be sent to the H-AMF entity through an N16' message transfer request. Alternatively, the modified QoS parameter may be sent to the H-AMF entity through an N1N2 message transfer request.

Optionally, in this embodiment of this application, after S605a, S604b, or S602c, the method may further include the following steps.

S606: The H-SMF entity performs N4 session modification with the H-UPF entity.

The N4 session modification is used to modify a configuration parameter of the PDU session on the H-UPF entity.

S607: The H-AMF entity sends an N14' message response to the V-AMF entity.

The N14' message response may include the modified QoS parameter.

Optionally, the modified QoS parameter may be independently used as an information element in the N14' message response, that is, the modified QoS parameter may be directly carried in the N14' message response, and the modified QoS parameter may be sent by the H-SMF entity to the H-AMF entity in S605a, S604b, or S602c. Alternatively, the modified QoS parameter may be carried in an N16' message transfer request, and the N16' message transfer request may be carried in the N14' message response. Alternatively, the modified QoS parameter may be carried in an N1N2 message transfer request, and the N1N2 message transfer request may be carried in the N14' message response.

S608: The V-AMF entity sends a PDU session update session management context request to the V-SMF entity, where the PDU session update session management context request may include the modified QoS parameter.

Optionally, the modified QoS parameter may be directly carned in the PDU session update session management context request, that is, the modified QoS parameter may be independently used as an information element in the PDU session update SM context request, and the modified QoS parameter is sent by the H-AMF entity to the V-AMF entity in S607. Alternatively, the modified QoS parameter may be carried in an N16' message transfer request, and the N16' message transfer request may be carried in the PDU session update session management context request. Alternatively, the modified QoS parameter may be carried in an N1N2 message transfer request, and the N1N2 message transfer request is carried in the PDU session update session management context request.

S609: The V-SMF entity sends an N1N2 message transfer (N1/N2 message transfer) request to the V-AMF entity.

The V-SMF entity may obtain a QoS profile and/or a QoS rule from the modified QoS parameter. The QoS profile may be included in N2 SM info, the QoS rule may be included in N1 SM info, and the N1 SM info and/or the N2 SM info may be included in the N1N2 message transfer request and sent to the V-AMF entity.

S610: The V-AMF entity sends an N2 PDU session request to the RAN node. The N2 PDU session request may include the N1 SM info and/or the N2 SM info.

S611: The RAN node performs RRC reconfiguration with the UE.

Optionally, if the RAN node receives the N1 SM info in S610, the RAN node sends the N1 SM info to the UE in an RRC reconfiguration procedure.

S612: The RAN node sends an N2 PDU session request acknowledgement (N2 PDU session request ack) message to the V-AMF entity.

S613: The V-AMF entity sends a PDU session update session management context request to the V-SMF entity.

S614: The V-SMF entity performs N4 session modification with the V-UPF entity, to modify a configuration parameter on the V-UPF entity.

It can be learned from the foregoing that, in this embodiment of this application, the PDU session, of the UE, home-routed from the private network to the public network may be modified.

Figure 7:
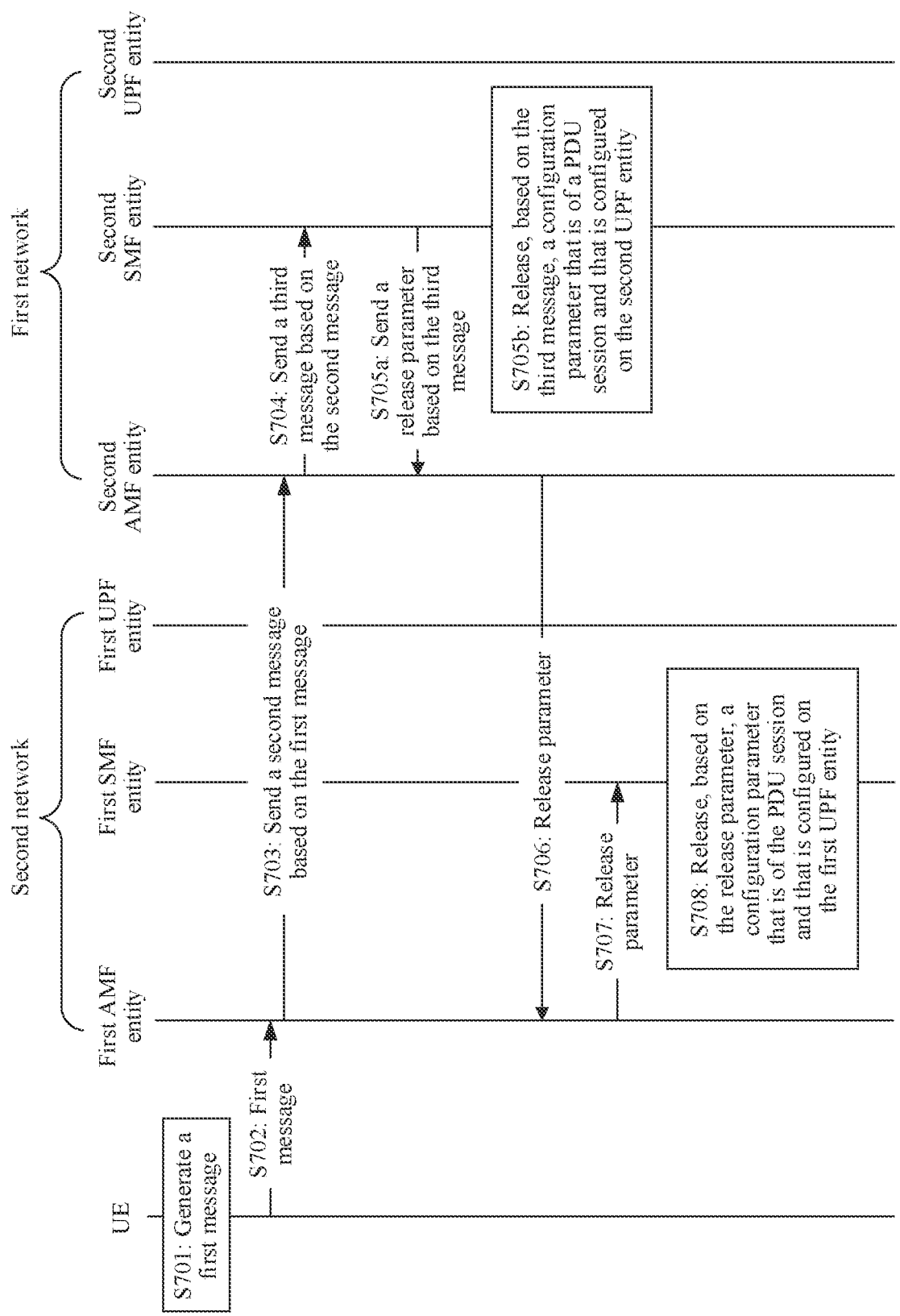
FIG. 7 is a schematic flowchart of a communications method according to an embodiment of this application.

As shown in FIG. 7, this application provides a communications method. The communications method may be used to release a PDU session between a first network and a second network. For example, in the method, the first network may be the private network in the network architecture shown in FIG. 1B, and the second network may be the public network in the network architecture shown in FIG. 1B. Alternatively, the first network may be the public network in the network architecture shown in FIG. 1A, and the second network may be the private network in the network architecture shown in FIG. 1A. A terminal device may be UE. As shown in FIG. 7, a procedure is specifically as follows:

S701: The UE generates a first message, where the first message is used to request to release the PDU session home-routed to the first network.

S702: The UE sends the first message to a first AMF entity.

S703: The first AMF entity sends a second message to a second AMF entity based on the first message, where the second message is used to request to release the PDU session.

Specifically, the first AMF entity may determine, based on stored information about the PDU session, whether the PDU session is a PDU session that needs to be home-routed to the first network, and send the second message to the second AMF entity if the PDU session is the PDU session that needs to be home-routed to the first network. The second message is used to request to release the PDU session. Optionally, in this embodiment of this application, after the PDU session is successfully established, the V-AMF entity may mark the PDU session as a PDU session home-routed from a private network to a public network.

Alternatively, S701 to S703 are as follows: A first AMF entity sends a second message to a second AMF entity. In other words, in this embodiment of this application, the first AMF entity may directly trigger release of the PDU session that is home-routed.

S704: The second AMF entity sends a third message to a second SMF entity based on the second message, where the third message is used to request to release the PDU session home-routed from the private network to the public network. Optionally, after the PDU session is successfully established, the second AMF entity may mark the PDU session as the PDU session home-routed from the private network to the public network.

S705a: The second SMF entity sends a release parameter to the second AMF entity based on the third message, where the release parameter is used to release the PDU session home-routed from the private network to the public network. Optionally, after the PDU session is successfully established, the second SMF entity may mark the PDU session as the PDU session home-routed from the private network to the public network.

S705b: The second SMF entity releases, based on the third message, a configuration parameter that is of the PDU session and that is configured on a second UPF entity. A sequence of step S705a and step S705b is not limited.

S706: The second AMF entity sends the release parameter to the first AMF entity.

S707: The first AMF entity sends the release parameter to a first SMF entity.

S708: The first SMF entity releases, based on the release parameter, a configuration parameter that is of the PDU session and that is configured on a first UPF entity.

In this embodiment of this application, the release parameter of the PDU session may include an N2 session management resource release request (N2 SM Resource Release request) sent to a RAN node and/or a PDU session release command sent to the UE. It can be learned from the foregoing that in this embodiment of this application, the UE or the first AMF entity may trigger release of the PDU session, of the UE, home-routed from the private network to the public network.

Figure 8:
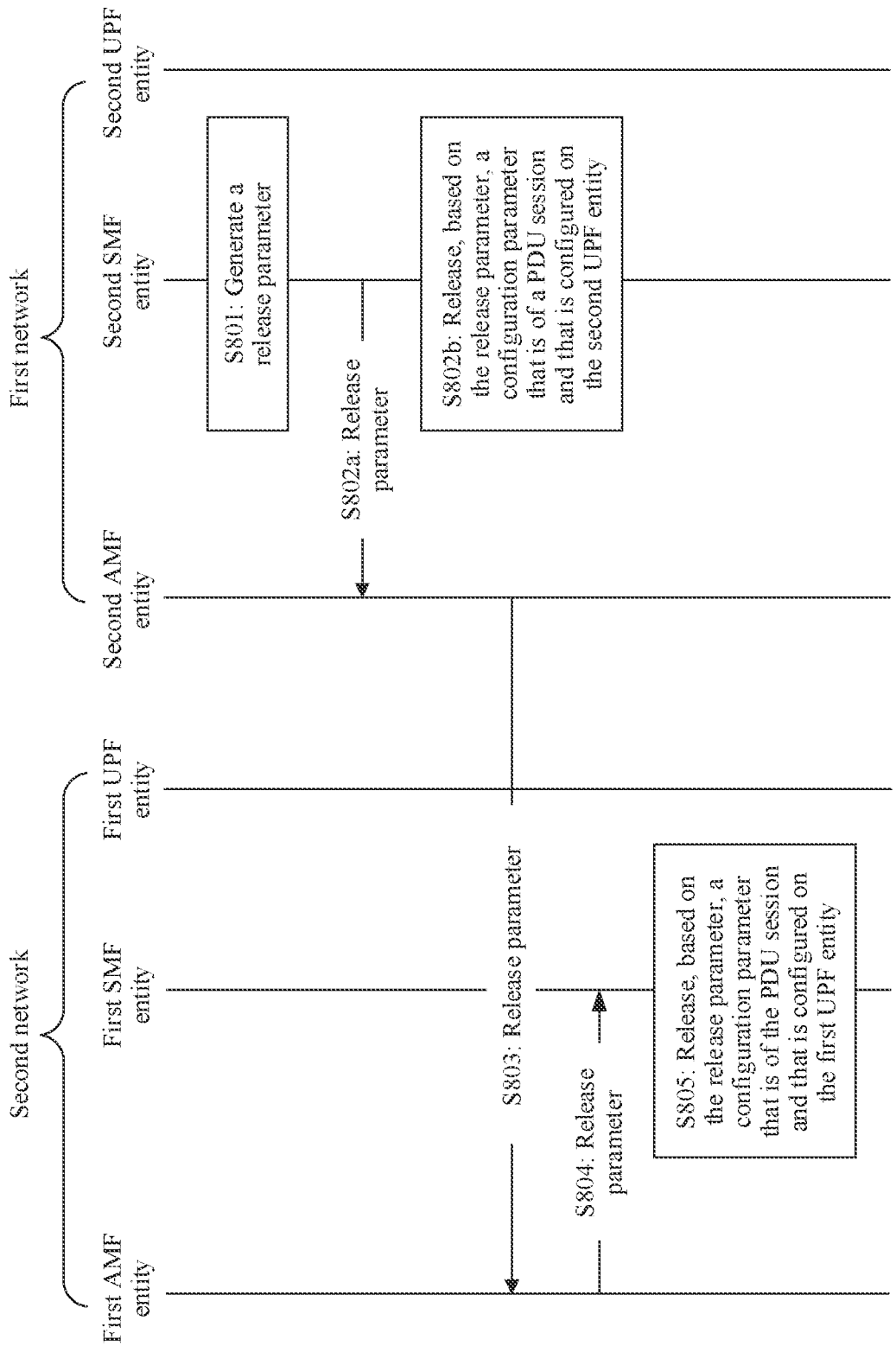
FIG. 8 is a schematic flowchart of a communications method according to an embodiment of this application.

As shown in FIG. 8, this application provides a communications method. The communications method may be used to release a PDU session between a first network and a second network. In the method, the first network may be the private network in the network architecture shown in FIG. 1B, and the second network may be the public network in the network architecture shown in FIG. 1B. Alternatively, the first network may be the public network in the network architecture shown in FIG. 1A, and the second network may be the private network in the network architecture shown in FIG. 1A. A terminal device may be UE.

S801: A second SMF entity generates a release parameter, where the release parameter is used to release the PDU session, of the UE, home-routed from a private network to a public network. Optionally, after the PDU session is successfully established, the second SMF entity may mark the PDU session as a PDU session home-routed from the private network to the public network.

In this embodiment of this application, a second PCF entity may trigger an entire release procedure, or the second SMF entity may trigger an entire release procedure. In this embodiment of this application, an example in which the second SMF entity triggers the entire release procedure is used for description, but this constitutes no limitation on this application. If the second PCF entity triggers the entire release procedure, before step S801, the method may further include: The second PCF entity sends a trigger command to the second SMF entity.

S802a: The second SMF entity sends the release parameter to a second AMF entity.

S802b: The second SMF entity releases, based on the release parameter, a configuration parameter that is of the PDU session and that is configured on a second UPF entity. A sequence of S802a and S802b is not limited.

S803: The second AMF entity sends the release parameter to a first AMF entity. Optionally, after the PDU session is successfully established, the second AMF entity may mark the PDU session as the PDU session home-routed from the private network to the public network.

S804: The first AMF entity sends the release parameter to a first SMF entity. Optionally, after the PDU session is successfully established, the first AMF entity may mark the PDU session as the PDU session home-routed from the private network to the public network.

S805: The first SMF entity releases, based on the release parameter, a configuration parameter that is of the PDU session and that is configured on a first UPF entity.

It can be learned from the foregoing that in this embodiment of this application, the second SMF entity or the second PCF entity may trigger release of the PDU session, of the UE, home-routed from the private network to the public network.

Figure 9B:
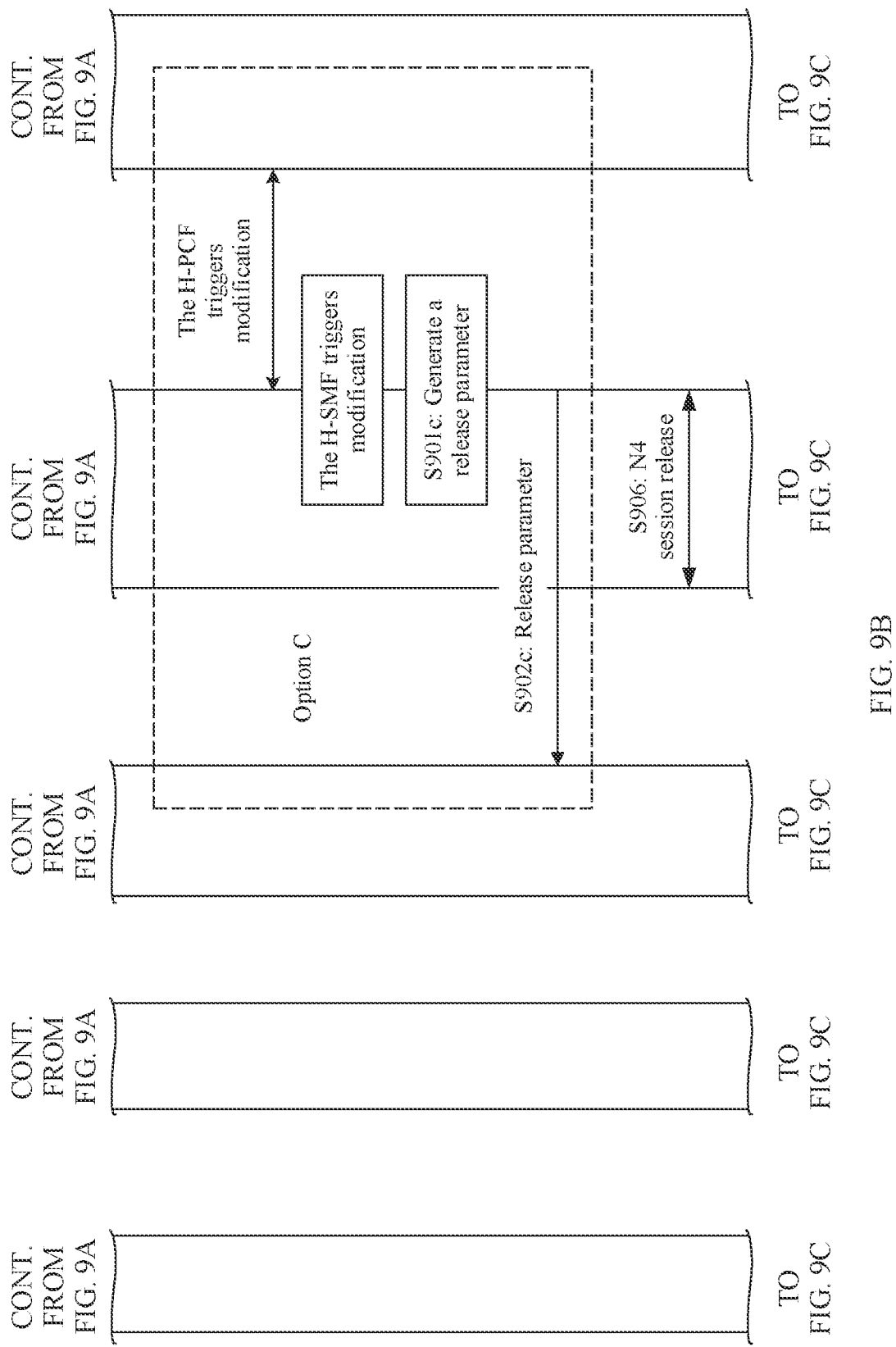
Figure 9C:
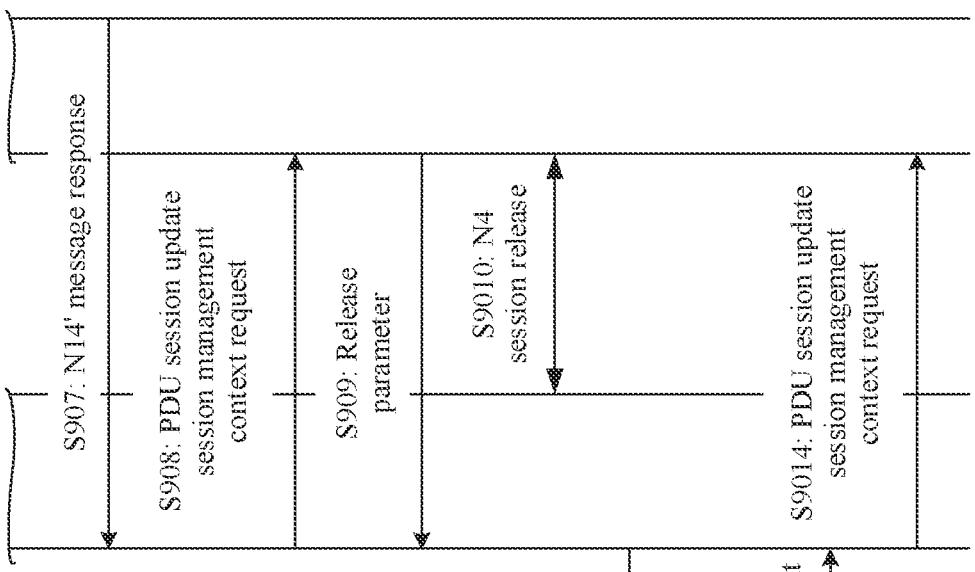

In an embodiment of this application, for example, a second network is a private network, a first AMF entity, a first UPF entity, and a first SMF entity in the second network are respectively a V-AMF entity, a V-UPF entity, and a V-SMF entity, a first network is a public network, a second AMF entity, a second UPF entity, and a second SMF entity in the first network are respectively an H-AMF entity, an H-UPF entity, and an H-SMF entity, and a terminal device is UE. As shown in FIG. 9A to FIG. 9C, this application provides a communications method. In the communications method shown in FIG. 9A to FIG. 9C, the UE may trigger release of a PDU session, a RAN node may trigger release of a PDU session, or the H-SMF entity may trigger release of a PDU session. In this embodiment of this application, three cases: an option A, an option B. and an option C, are described. The option A may include S901a to S904a, the option B may include S901b to S904b, and the option C may include S901c and S902c.

The option A is specifically as follows: S901a: The UE sends an N1 mobility management message to the V-AMF entity.

The N1 mobility management message may include a PDU session release request.

S902a: The V-AMF entity sends an N14' message to the H-AMF entity, where the N14' message is used to request to release the PDU session.

The N14' message may include the PDU session release request. Optionally, after the PDU session is successfully established, the V-AMF entity may mark the PDU session as a PDU session home-routed from the private network to the public network.

S903a: The H-AMF entity sends a PDU session release session management context request to the H-SMF entity.

For example, the PDU session release session management context request may be a network element SMF PDU session release session management context request (Nsmf_PDUsession_Release SM context request), and the PDU session release session management context request may include the PDU session release request and the like. Optionally, after the PDU session is successfully established, the H-AMF entity may mark the PDU session as the PDU session home-routed from the private network to the public network.

S904a: The H-SMF entity sends, to the H-AMF entity, a release parameter used to release the PDU session.

Optionally, the release parameter may be included in a PDU session update session management context request response. Alternatively, the release parameter may be included in an N16' message transfer request.

Optionally, after the PDU session is successfully established, the H-SMF entity may mark the PDU session as the PDU session home-routed from the private network to the public network.

The option B may be specifically as follows: S901b: The V-AMF entity triggers release of the PDU session.

S902b: The V-AMF entity sends an N14' message to the H-AMF entity, where the N14' message is used to request to release the PDU session.

Optionally, after the PDU session is successfully established, the V-AMF entity may mark the PDU session as a PDU session home-routed from the private network to the public network.

S903b: The H-AMF entity sends a PDU session release session management context request to the H-SMF entity.

For example, the PDU session release session management context request may be a network element SMF PDU session release session management context request (Nsmf_PDUsession_Release SM context request), and the PDU session release session management context request is used to release the PDU session, of the UE, home-routed from the private network to the public network.

Optionally, after the PDU session is successfully established, the H-AMF entity may mark the PDU session as the PDU session home-routed from the private network to the public network.

S904b: The H-SMF entity sends, to the H-AMF entity, a release parameter used to release the PDU session.

The release parameter may be used to release the PDU session, of the UE, home-routed from the private network to the public network.

Optionally, the release parameter may be included in a PDU session release network element management context response, and the PDU session release network element management context response may be a network element SMF PDU session release network element management context response (Nsfm_PDUsession_ReleaseSM context response). Alternatively, the release parameter may be included in an N16' message transfer request.

Optionally, after the PDU session is successfully established, the H-SMF entity may mark the PDU session as the PDU session home-routed from the private network to the public network.

The option C may be specifically as follows: S901c: The H-SMF entity generates a release parameter, where the release parameter may be used to release the PDU session, of the UE, home-routed from the private network to the public network.

An H-PCF entity may trigger an entire release procedure, or the H-SMF entity may trigger an entire release procedure.

S902c: The H-SMF entity sends the release parameter to the H-AMF entity.

Optionally, the release parameter may be included in an N16' message transfer request. Alternatively, the release parameter may be included in an N1N2 message transfer request. Optionally, after the PDU session is successfully established, the H-SMF entity may mark the PDU session as a PDU session home-routed from the private network to the public network.

Optionally, after S904a. S904b, or S902c, the method may further include the following steps.

S906: The H-SMF entity performs N4 session release with the H-UPF entity.

The N4 session release is used to release a configuration parameter that is of the PDU session and that is configured on the H-UPF entity.

S907: The H-AMF entity sends an N14' message response to the V-AMF entity.

The N14' message response may include the release parameter.

Optionally, the release parameter may be independently used as an information element in the N14' message response, that is, the release parameter may be directly carried in the N14' message response, and the release parameter may be sent by the H-AMF entity to the V-AMF entity in S907. Alternatively, the release parameter may be carried in an N16' message transfer request, and the N16' message transfer request is carried in the N14' message response. Alternatively, the release parameter may be carried in an N1N2 message transfer request, and the N1N2 message transfer request is carried in the N14' message response.

S908: The V-AMF entity sends a PDU session update session management context request to the V-SMF entity.

The PDU session update session management context request may include the release parameter.

Optionally, the release parameter may be independently used as an information element in the PDU session update session management context request, that is, the release parameter may be directly carried in the PDU session update session management context request. Alternatively, the release parameter may be carried in an N16' message transfer request, and the N16' message transfer request is carried in the PDU session update session management context request. Alternatively, the release parameter may be carried in an N1N2 message transfer request, and the N1N2 message transfer request may be carried in the PDU session update session management context request.

Alternatively, S908 is as follows: The V-AMF entity sends a PDU session release session management context request to the V-SMF entity.

The PDU session release session management context request may include the release parameter.

Optionally, the release parameter may be independently used as an information element in the PDU session release session management context request, that is, the release parameter may be directly carried in the PDU session release session management context request. Alternatively, the release parameter may be carrid in an N16' message transfer request, and the N16' message transfer request is carried in the PDU session release session management context request. Alternatively, the release parameter may be carried in an N1N2 message transfer request, and the N1N2 message transfer request is carried in the PDU session release session management context request.

S909: The V-SMF entity sends, to the V-AMF entity, a release parameter used to release the PDU session, where the release parameter of the PDU session may include an N2 session management resource release request sent to the RAN node and/or a PDU session release command sent to the UE. Optionally, the release parameter may be carried in a PDU session update session management context response. Alternatively, the release parameter may be carried in an N1N2 message transfer (N1/N2 message transfer) request. Alternatively, the release parameter may be carried in a PDU session release session management context response.

S9010: The V-SMF entity performs N4 session release with the V-UPF entity, where the N4 session release is used to release a configuration parameter that is of the PDU session and that is configured on the V-UPF entity. A sequence of step S909 and step S9010 is not limited.

S9011: The V-AMF entity sends an N2 PDU session request to the RAN node. The N2 PDU session request may include an N2 session management resource release request (N2 SM Resource Release request) and a PDU session release command.

S9012: The RAN node performs RRC reconfiguration with the UE.

Optionally, if the PDU session release command is included in S9011, the RAN node may send the PDU session release command to the UE in an RRC reconfiguration procedure.

S9013: The RAN node sends an N2 PDU session request acknowledgement (N2 PDU session request ack) message to the V-AMF entity.

S9014: The V-AMF entity sends a PDU session update session management context request to the V-SMF entity.

In this embodiment of this application, the UE may trigger release of the PDU session, the RAN node may trigger release of the PDU session, or the H-SMF entity may trigger release of the PDU session.

Figure 10:
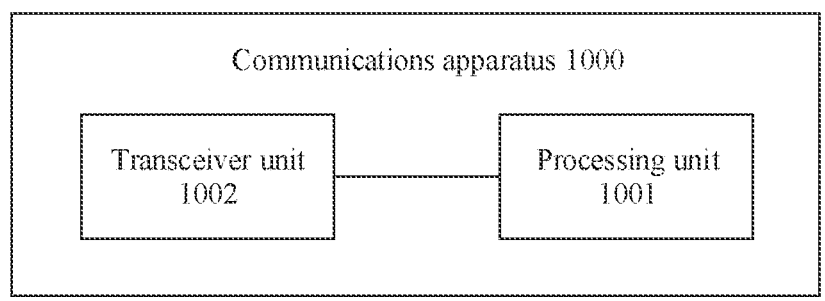
FIG. 10 is a schematic structural diagram of a communications apparatus according to an embodiment of this application.

Based on the foregoing concept, as shown in FIG. 10, this application provides a communications apparatus 1000. The communications apparatus 1000 may include a processing unit 1001 and a transceiver unit 1002.

In an example of this application, the communications apparatus 1000 may be used in a terminal device or a chip in the terminal device, and configured to perform steps performed by the terminal device in the procedure shown in FIG. 2, FIG. 3A to FIG. 3C, FIG. 4, FIG. 5, FIG. 6A to FIG. 6C, FIG. 7, FIG. 8, or FIG. 9A to FIG. 9C. For example, the processing unit 1001 may be configured to generate a first message, and the transceiver unit 1002 may be configured to send the first message to a first AMF entity.

In an example of this application, the communications apparatus 1000 may be used in a first AMF entity or a chip in the first AMF entity, and configured to perform steps performed by the first AMF entity in the procedure shown in FIG. 2, FIG. 3A to FIG. 3C, FIG. 4, FIG. 5, FIG. 6A to FIG. 6C, FIG. 7, FIG. 8, or FIG. 9A to FIG. 9C. For example, the transceiver unit 1002 may be configured to receive a first message from a terminal device. The processing unit 1001 may be configured to control, based on the first message, the transceiver unit 1002 to send a second message to a first SMF entity. The second message is used to request core network tunnel information of a PDU session. The transceiver unit 1002 may be configured to: receive first core network tunnel information from the first SMF entity, and send the first core network tunnel information to a second AMF entity. The first core network tunnel information is used to establish a data channel, of the PDU session, between a first user plane function UPF entity and a UPF entity in a first network.

In an example of this application, the communications apparatus 1000 may be used in a first SMF entity or a chip in the first SMF entity, and configured to perform steps performed by the first SMF entity in the procedure shown in FIG. 2, FIG. 3A to FIG. 3C, FIG. 4, FIG. 5, FIG. 6A to FIG. 6C, FIG. 7, FIG. 8, or FIG. 9A to FIG. 9C. For example, the transceiver unit 1002 may be configured to receive a second message from a first access and mobility management function AMF entity. The second message is used to request core network tunnel information of a PDU session. The transceiver unit 1002 may be configured to send a first core network tunnel information to the first AMF entity. The first core network tunnel information is used to establish a data channel, of the PDU session, between a first user plane function UPF entity and a UPF entity in a first network.

In an example of this application, the communications apparatus 1000 may be used in a second AMF entity or a chip in the second AMF entity, and configured to perform steps performed by the second AMF entity in the procedure shown in FIG. 2. FIG. 3A to FIG. 3C. FIG. 4, FIG. 5, FIG. 6A to FIG. 6C, FIG. 7, FIG. 8, or FIG. 9A to FIG. 9C. For example, the transceiver unit 1002 may be configured to receive first core network tunnel information from a first AMF entity. The first core network tunnel information is used to establish a data channel, of the PDU session, between a first user plane function UPF entity and a UPF entity in a first network. The transceiver unit 1002 is further configured to send the first core network tunnel information to a second SMF entity.

In an example of this application, the communications apparatus 1000 may be used in a second SMF entity or a chip in the second SMF entity, and configured to perform steps performed by the second SMF entity in the procedure shown in FIG. 2, FIG. 3A to FIG. 3C, FIG. 4, FIG. 5, FIG. 6A to FIG. 6C, FIG. 7, FIG. 8, or FIG. 9A to FIG. 9C. For example, the transceiver unit 1002 may be configured to receive first core network tunnel information from a second AMF entity. The first core network tunnel information is used to establish a data channel, of a PDU session, between a first user plane function UPF entity and a UPF entity in a first network. The transceiver unit 1002 may be configured to send second core network tunnel information to the second AMF entity. The second core network tunnel information is used to establish the data channel, of the PDU session, between the first UPF entity and the UPF entity in the first network.

For specific functions of the processing unit 1001 and the transceiver unit 1002, refer to descriptions of the procedure shown in FIG. 2, FIG. 3A to FIG. 3C, FIG. 4, FIG. 5, FIG. 6A to FIG. 6C, FIG. 7, FIG. 8, or FIG. 9A to FIG. 9C. Details are not described herein again.

Figure 11:
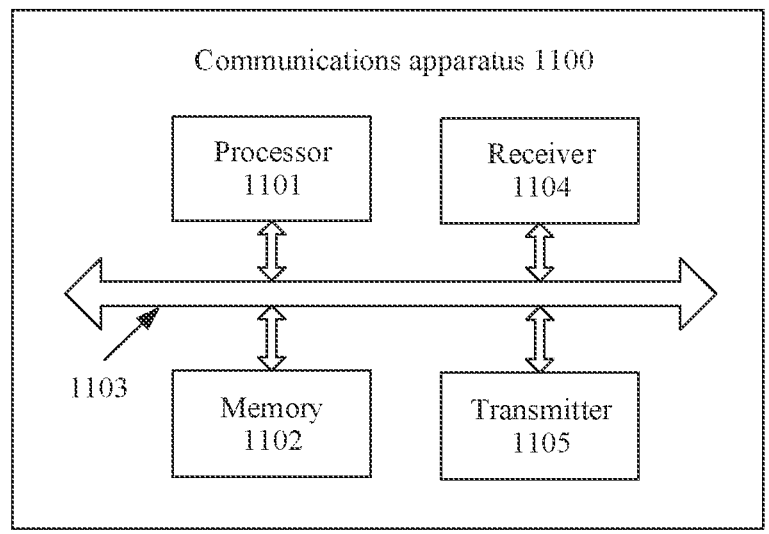
FIG. 11 is a schematic structural diagram of a communications apparatus according to an embodiment of this application.

Based on the foregoing concept, as shown in FIG. 11, this application further provides a communications apparatus 1100. The communications apparatus 1100 may be used in the terminal device or a chip in the terminal device in the procedures shown in FIG. 2 to FIG. 9A to FIG. 9C, may be used in the first AMF entity or a chip in the first AMF entity in the procedures shown in FIG. 2 to FIG. 9A to FIG. 9C, may be used in the first SMF entity or a chip in the first SMF entity in the procedures shown in FIG. 2 to FIG. 9A to FIG. 9C, may be used in the second AMF entity or a chip in the second AMF entity in the procedures shown in FIG. 2 to FIG. 9A to FIG. 9C, or may be used in the second SMF entity or a chip in the second SMF entity in the procedures shown in FIG. 2 to FIG. 9A to FIG. 9C. This is not limited herein.

The communications apparatus 1100 may include a processor 1101 and a memory 1102. Further, the apparatus may include a receiver 1104 and a transmitter 1105. Further, the apparatus may include a bus system 1103.

The processor 1101, the memory 1102, the receiver 1104, and the transmitter 1105 may be connected through the bus system 1103. The memory 1102 may be configured to store an instruction. The processor 1101 may be configured to execute the instruction stored in the memory 1102, to control the receiver 1104 to receive a signal and control the transmitter 1105 to send a signal, so as to complete steps performed by the terminal device, the first SMF entity, the first AMF entity, the second SMF entity, or the second AMF entity in the methods shown in FIG. 2 to FIG. 9A to FIG. 9C.

The receiver 1104 and the transmitter 1105 may be different physical entities or a same physical entity, and may be collectively referred to as a transceiver. The memory 1102 may be integrated into the processor 1101, or the memory 1102 and the processor 1101 may be different physical entities.

In an implementation, functions of the receiver 1104 and the transmitter 1105 may be considered to be implemented through a transceiver circuit or a dedicated transceiver chip. The processor 1101 may be considered to be implemented through a dedicated processing chip, a processing circuit, a processor, or a general-purpose chip.

In another implementation, functions of the network device or the terminal device provided in the embodiments of this application may be considered to be implemented through a computer. To be specific, program code for implementing functions of the processor 1101, the receiver 1104, and the transmitter 1105 is stored in the memory 1102, and a general-purpose processor may implement the functions of the processor 1101, the receiver 1104, and the transmitter 1105 by executing the code in the memory.

For concepts, explanations, detailed descriptions, and other steps of the communications apparatus 11X) that are related to the technical solutions provided in this application, refer to the descriptions of the content in the foregoing methods or other embodiments. Details are not described herein again.

In an example of this application, the communications apparatus 1100 may be used in the terminal device or the chip in the terminal device, and the communications apparatus 1100 may be configured to perform the steps performed by the terminal device in the procedures shown in FIG. 2 to FIG. 9A to FIG. 9C. For example, the processor 1101 may be configured to generate a first message, and the transmitter 1105 may be configured to send the first message to a first AMF entity.

In an example of this application, the communications apparatus 1100 may be used in the first AMF entity or the chip in the first AMF entity, and the communications apparatus 1100 may be configured to perform the steps performed by the first AMF entity in the procedures shown in FIG. 2 to FIG. 9A to FIG. 9C. For example, the receiver 1104 may be configured to receive a first message from a terminal device, the processor 1101 may be configured to control, based on the first message, the transmitter 1105 to send a second message, and the receiver 1104 may be configured to receive first core network tunnel information from a first SMF entity.

In an example of this application, the communications apparatus 1100 may be used in the first SMF entity or the chip in the first SMF entity, and the communications apparatus 1100 may be configured to perform the steps performed by the first SMF entity in the procedures shown in FIG. 2 to FIG. 9A to FIG. 9C. For example, the receiver 1104 may be configured to receive a second message from a first AMF entity, and the transmitter 1105 may be configured to send a first core network tunnel information to the first AMF entity.

In an example of this application, the communications apparatus 1100 may be used in the second AMF entity or the chip in the second AMF entity, and the communications apparatus 1100 may be configured to perform the steps performed by the second AMF entity in the procedures shown in FIG. 2 to FIG. 9A to FIG. 9C. For example, the receiver 1104 may be configured to receive first core network tunnel information from a first AMF entity, and the transmitter 1105 may be configured to send the first core network tunnel information to a second SMF entity.

In an example of this application, the communications apparatus 1100 may be used in the second SMF entity or the chip in the second SMF entity, and the communications apparatus 1100 may be configured to perform the steps performed by the second SMF entity in the procedures shown in FIG. 2 to FIG. 9A to FIG. 9C. For example, the receiver 1104 may be configured to receive first core network tunnel information from a second AMF entity, and the transmitter 1105 may be configured to send second core network tunnel information to the second AMF entity.

For descriptions of the processor 1101, the receiver 1104, and the transmitter 1105, refer to the descriptions of the procedures shown in FIG. 2 to FIG. 9A to FIG. 9C. Details are not described herein again.

Figure 12:
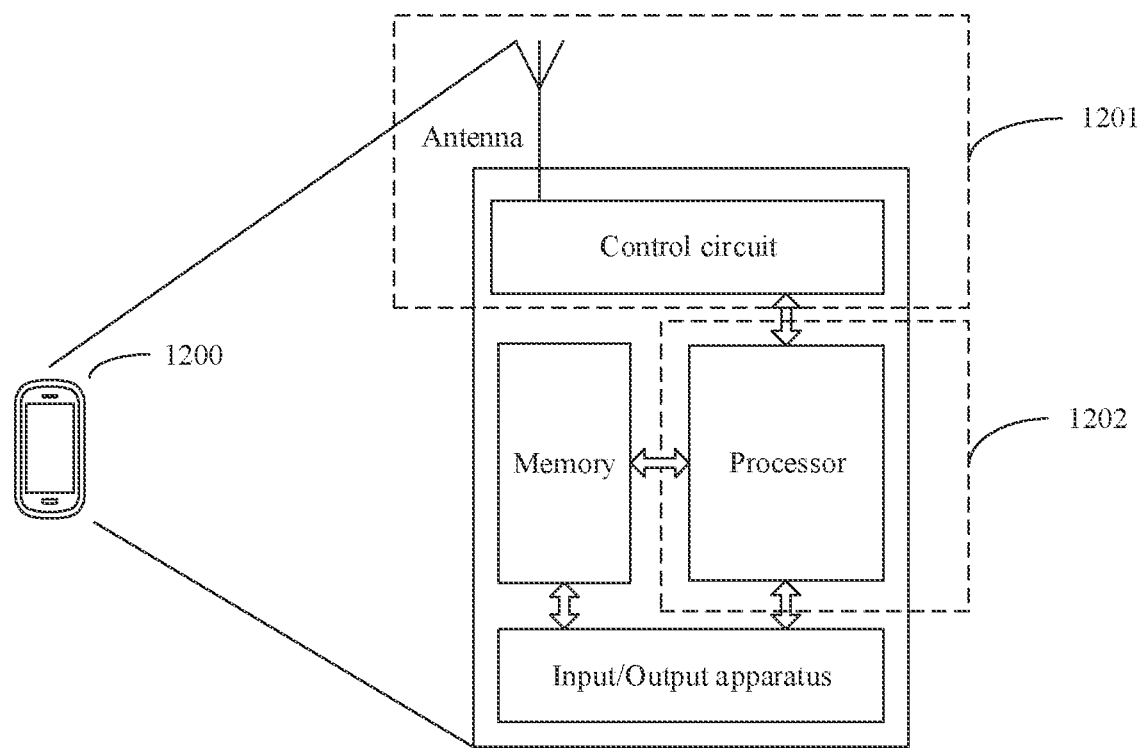
FIG. 12 is a schematic structural diagram of a terminal device according to an embodiment of this application.

Same as the foregoing concept, FIG. 12 is a schematic structural diagram of a terminal device. The terminal device is applicable to the steps performed by the terminal device in the procedures shown in FIG. 2 to FIG. 9A to FIG. 9C. For ease of description, FIG. 12 shows only main components of the terminal device. As shown in FIG. 12, the terminal device 1200 may include a processor, a memory, and a control circuit, and optionally, may further include an antenna and/or an input/output apparatus. The processor may be configured to: process a communications protocol and communication data, control user equipment, execute a software program, and process data of the software program. The memory may store the software program and/or the data. The control circuit may be configured to: perform conversion between a baseband signal and a radio frequency signal, and process the radio frequency signal. The control circuit and the antenna may also be referred to as a transceiver, and may be configured to send and receive radio frequency signals in an electromagnetic wave form. The input/output apparatus such as a touchscreen, a display, or a keyboard may be configured to receive data entered by a user and output data to the user.

In this embodiment of this application, the processor may read the software program in a storage unit, interpret and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the user equipment, the radio frequency circuit receives a radio frequency signal through the antenna, converts the radio frequency signal into a baseband signal, and outputs the baseband signal to the processor, and the processor converts the baseband signal into data and processes the data.

A person skilled in the art may understand that, for ease of description, FIG. 12 shows only one memory and one processor. In actual user equipment, there may be a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor may be configured to process the communications protocol and the communication data. The central processing unit may be configured to: control the entire user equipment, execute the software program, and process the data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

For example, in this embodiment of this application, the antenna that has a transceiver function and the control circuit may be used as a transceiver unit 1201 of the terminal device 1200, and the processor having a processing function may be considered as a processing unit 1202 of the terminal device 1200. As shown in FIG. 12, the terminal device 1200 may include the transceiver unit 1201 and the processing unit 1202. The transceiver unit may also be referred to as a transceiver, a transceiver apparatus, or the like. Optionally, a component that is in the transceiver unit 1201 and that is configured to implement a reception function may be considered as a receiving unit, and a component that is in the transceiver unit 1201 and that is configured to implement a transmission function may be considered as a sending unit. In other words, the transceiver unit 1201 includes the receiving unit and the sending unit. For example, the receiving unit may also be referred to as a receiver, a receive circuit, or the like, and the sending unit may also be referred to as a transmitter, a transmit circuit, or the like.

It should be understood that in the foregoing apparatus embodiments, the network device and the terminal device completely correspond to the network device or the terminal device in the method embodiments. A corresponding module or unit performs a corresponding step. For example, a sending module (transmitter) performs a sending step in the method embodiments, a receiving module (receiver) performs a receiving step in the method embodiments, and steps other than the sending step and the receiving step may be performed by a processing module (processor). For a function of a specific module, refer to the corresponding method embodiments. The sending module and the receiving module may form a transceiver module, and the transmitter and the receiver may form a transceiver, to jointly implement receiving and sending functions. There may be one or more processors.

According to the method provided in the embodiments of this application, an embodiment of this application further provides a communications system. The communications system includes the foregoing terminal device, first AMF entity, first SMF entity, second AMF entity, second SMF entity, and the like.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement a function in any one or more of the foregoing embodiments, for example, obtain or process information or a message in the foregoing methods. Optionally, the chip further includes a memory. The memory is configured to store a program instruction and data that are executed by the processor. The chip may also include a chip and another discrete component.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a discrete hardware component, or the like. The general-purpose processor may be a microprocessor, any conventional processor, or the like.

The memory may include a read-only memory and a random access memory, and provide an instruction and data for the processor. A part of the memory may further include a nonvolatile random access memory.

The bus system may further include a power bus, a control bus, a status signal bus, and the like, in addition to a data bus. However, for clear description, various types of buses in the figure are marked as the bus system. In an implementation process, steps in the foregoing methods can be implemented by using a hardware integrated logic circuit in the processor or by using instructions in a form of software. The steps of the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps in the foregoing methods in combination with the hardware of the processor. To avoid repetition, details are not described herein.

In the embodiments of this application, unless otherwise stated or there is a logical conflict, terms and/or descriptions between different embodiments are consistent and may be mutually referenced, and technical features in different embodiments may be combined according to an internal logical relationship thereof, to form a new embodiment.

It may be understood that numerical symbols in the embodiments of this application are differentiated merely for ease of description, but are not used to limit the scope of the embodiments of this application. Sequence numbers of the foregoing processes do not mean execution sequences. The execution sequences of the processes should be determined according to functions and internal logic of the processes.

What is claimed is:

1. A communications method, comprising:
generating, by a terminal device, a first message, wherein the first message is used to request to establish a protocol data unit (PDU) session home-routed to a first network; and
sending, by the terminal device, the first message to a first access and mobility management function (AMF) entity, wherein the first AMF entity is a network element in a second networks and wherein the first network is a private network and the second network is a public network, or the first network is a public network and the second network is a private network.

2. The method according to claim 1, wherein the first message comprises first indication information, and wherein the first indication information is used to indicate that the PDU session is a PDU session home-routed to the first network.

3. The method according to claim 2, wherein the first indication information comprises at least one of a data network name, slice selection information, network type indication information, or identifier information of the first network.

4. The method according to claim 1, wherein the first message comprises at least one of a data network name or slice selection information.

5. A communications method, comprising:
receiving, by a first access and mobility management function (AMF) entity, a first message from a terminal device, wherein the first message is used to request to establish a protocol data unit (PDU) session home-routed to a first network;
sending, by the first AMF entity, a second message to a first session management function (SMF) entity based on the first message, wherein the second message is used to request core network tunnel information of the PDU session;
receiving, by the first SMF entity, the second message;
sending, by the first SMF entity, first core network tunnel information to the first AMF entity based on the second message, wherein the first core network tunnel information is used to establish a data channel, of the PDU session, between a first user plane function (UPF) entity and a UPF entity in the first network; and
receiving, by the first AMF entity, the first core network tunnel information, and sending the first core network tunnel information to a second AMF entity;
wherein the first AMF entity, the first SMF entity, and the first UPF entity are network elements in a second network, and wherein the second AMF entity is a network element in the first network.

6. The method according to claim 5, wherein the first message comprises first indication information, and wherein the first indication information is used to indicate that the PDU session is a PDU session home-routed to the first network.

7. The method according to claim 6, wherein the first indication information comprises at least one of a data network name, slice selection information, network type indication information, or identifier information of the first network.

8. The method according to claim 6, wherein the second message comprises the first indication information.

9. The method according to claim 5, wherein the first message comprises at least one of a data network name or slice selection information, and wherein the method further comprises:
determining, by the first AMF entity based on a correspondence between indication information and at least one of a data network name or slice selection information, indication information corresponding to at least one of the data network name or the slice selection information in the first message; and
when the indication information corresponding to at least one of the data network name or the slice selection information in the first message is used to indicate that the PDU session is not allowed to be used for local breakout, determining, by the first AMF entity based on an identifier of the terminal device, that a home network of the PDU session is the first network; or
determining, by the first AMF entity based on a correspondence that is between a home-routed network identifier and at least one of a data network name or slice selection information and that is comprised in subscription information of the terminal device, that a home network of the PDU session is the first network.

10. The method according to claim 5, wherein the second message comprises second indication information; and
when the first network is a private network and the second network is a public network, the second indication information is used to indicate that a type of the PDU session requested to be established is a private network type; or
when the first network is a public network and the second network is a private network, the second indication information is used to indicate that a type of the PDU session requested to be established is a public network type.

11. The method according to claim 5, wherein the method further comprises:
   selecting, by the first AMF entity, a second SMF entity, wherein the second SMF entity is located in the first network.

12. The method according to claim 11, wherein the second message comprises an identifier of the second SMF entity; and
   when the first network is a private network, the identifier of the second SMF entity is used to indicate that the second SMF entity is an SMF entity in the private network; or
   when the first network is a public network, the identifier of the second SMF entity is used to indicate that the second SMF entity is an SMF entity in the public network.

13. The method according to claim 5, wherein the method further comprises:
   sending, by the first AMF entity, at least one of slice selection information, data network name, a PDU session establishment request, or identifier information of the second network to the second AMF entity.

14. The method according to claim 5, wherein the method further comprises:
   receiving, by the second AMF entity, the first core network tunnel information;
   sending, by the second AMF entity, the first core network tunnel information to a second SMF entity in the first network; and
   receiving, by the second SMF entity, the first core network tunnel information.

15. The method according to claim 14, wherein the method further comprises:
   sending, by the second SMF entity, second core network tunnel information to the second AMF entity, wherein the second core network tunnel information is used to establish the data channel, of the PDU session, between the first UPF entity and a second UPF entity in the first network;
   receiving, by the second AMF entity, the second core network tunnel information; and
   sending, by the second AMF entity, the second core network tunnel information to the first AMF entity.

16. A communications system, comprising: a first access and mobility management function (AMF) entity, a first session management function (SMF) entity, and a first user plane function (UPF) entity, wherein:
   the first AMF entity is configured to:
      receive a first message from a terminal device, wherein the first message is used to request to establish a protocol data unit (PDU) session home-routed to a first network; and
      send a second message to the first SMF entity based on the first message, wherein the second message is used to request core network tunnel information of the PDU session;
   the first SMF entity is configured to:
      receive the second message; and
      send first core network tunnel information to the first AMF entity based on the second message, wherein the first core network tunnel information is used to establish a data channel, of the PDU session, between the first UPF entity and a UPF entity in the first network; and
   the first AMF entity is further configured to:
      receive the first core network tunnel information; and
      send the first core network tunnel information to a second AMF entity;
   wherein the first AMF entity, the first SMF entity, and the first UPF entity are network elements in a second network, and wherein the second AMF entity is a network element in the first network.

17. The system according to claim 16, wherein the first message comprises first indication information, and wherein the first indication information is used to indicate that the PDU session is a PDU session home-routed to the first network.

18. The system according to claim 16, wherein the first message comprises at least one of a data network name or slice selection information, and wherein the first AMF entity is further configured to:
   determine, based on a correspondence between indication information and at least one of a data network name or slice selection information, indication information corresponding to at least one of the data network name or the slice selection information in the first message; and
   when the indication information corresponding to at least one of the data network name or the slice selection information in the first message is used to indicate that the PDU session is not allowed to be used for local breakout, determine, based on an identifier of the terminal device, that a home network of the PDU session is the first network; or determine, based on a correspondence that is between a home-routed network identifier and at least one of a data network name or slice selection information and that is comprised in subscription information of the terminal device, that a home network of the PDU session is the first network.

19. The system according to claim 16, wherein the system further comprises the second AMF entity and a second SMF entity in the first network;
   wherein the second AMF entity is configured to receive the first core network tunnel information, and send the first core network tunnel information to the second SMF entity; and
   wherein the second SMF entity is configured to receive the first core network tunnel information.

20. The system according to claim 19, wherein the second SMF entity is further configured to send second core network tunnel information to the second AMF entity, wherein the second core network tunnel information is used to establish the data channel, of the PDU session, between the first UPF entity and a second UPF entity in the first network; and
   wherein the second AMF entity is further configured to receive the second core network tunnel information, and send the second core network tunnel information to the first AMF entity.

* * * * *

UNITED STATES PATENT AND TRADEMARK OFFICE
CERTIFICATE OF CORRECTION

| | |
|---|---|
| PATENT NO. | : 11,844,142 B2 |
| APPLICATION NO. | : 17/217434 |
| DATED | : December 12, 2023 |
| INVENTOR(S) | : Jiangwei Ying and Yanmei Yang |

It is certified that error appears in the above-identified patent and that said Letters Patent is hereby corrected as shown below:

In the Claims

Column 39, Line 45, Claim 1, please delete "networks" and insert therefore -- network, --.

Signed and Sealed this
Fourth Day of June, 2024

Katherine Kelly Vidal
*Director of the United States Patent and Trademark Office*